US012785446B2

(12) United States Patent
Yin et al.

(10) Patent No.: US 12,785,446 B2
(45) Date of Patent: Nov. 3, 2026

(54) AMBIENT INTERNET-OF-THINGS FORWARD LINK INTERRUPTION MITIGATION

(71) Applicant: QUALCOMM Incorporated, San Diego, CA (US)

(72) Inventors: Mingxi Yin, Beijing (CN); Chao Wei, Beijing (CN); Kangqi Liu, San Diego, CA (US); Ruiming Zheng, Beijing (CN); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 19/143,174

(22) PCT Filed: Mar. 8, 2023

(86) PCT No.: PCT/CN2023/080282
§ 371 (c)(1),
(2) Date: Jun. 25, 2025

(87) PCT Pub. No.: WO2024/183022
PCT Pub. Date: Sep. 12, 2024

(65) Prior Publication Data

US 2026/0221805 A1 Jul. 30, 2026

(51) Int. Cl.
*H02J 50/00* (2016.01)
*H02J 50/20* (2016.01)
*H04L 67/12* (2022.01)

(52) U.S. Cl.
CPC ............ *H02J 50/001* (2020.01); *H02J 50/20* (2016.02); *H04L 67/12* (2013.01)

(58) Field of Classification Search
CPC .......... H02J 50/001; H02J 50/20; H04L 67/12
USPC ........................................................ 307/104
See application file for complete search history.

(56) References Cited

U.S. PATENT DOCUMENTS

2022/0225402 A1 7/2022 Elkotby et al.
2025/0324442 A1 * 10/2025 Liu .................. H04W 72/0446

FOREIGN PATENT DOCUMENTS

CN 104954975 A 9/2015
CN 112312431 A 2/2021
WO 2022265567 A1 12/2022

OTHER PUBLICATIONS

International Search Report and Written Opinion—PCT/CN2023/080282—ISA/CN—Nov. 20, 2023.

* cited by examiner

*Primary Examiner* — Richard Tan
(74) *Attorney, Agent, or Firm* — Procopio, Cory, Hargreaves & Savitch LLP/Qualcomm

(57) ABSTRACT

In an aspect, a first wireless device may transmit, for a first duration, a first portion of an energy harvesting signal to an ambient IoT device, the first duration being less than a total duration for energy harvesting to complete at the ambient IoT device. The first wireless device may receive one of (a) an indication that a first radio access technology (RAT)-based signal is to be transmitted by the first wireless device or (b) a second RAT-based signal from a second wireless device, where each of the first RAT-based signal and the second RAT-based signal interrupts transmission of the energy harvesting signal. The first wireless device may perform an action to mitigate interruption of the energy harvesting signal.

20 Claims, 22 Drawing Sheets

600

AMBIENT INTERNET-OF-THINGS FORWARD LINK INTERRUPTION MITIGATION

CROSS-REFERENCE TO RELATED APPLICATION

This application is a 371 National Stage of PCT Application No. PCT/CN2023/080282, filed on Mar. 8, 2023, entitled "AMBIENT INTERNET-OF-THINGS FORWARD LINK INTERRUPTION MITIGATION", and assigned to the assignee hereof. The disclosure of the prior Application is considered part of and is incorporated by reference herein in its entirety into this Patent Application.

TECHNICAL FIELD

The present disclosure relates generally to communication systems, and more particularly, to wireless communication including Internet-of-Things (IoT) devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first wireless device are provided. The apparatus may include memory and at least one processor coupled to the memory. The at least one processor, based at least in part on information stored in the memory may be configured to transmit, for a first duration, a first portion of an energy harvesting signal to an ambient IoT device, the first duration being less than a total duration for energy harvesting to complete at the ambient IoT device, to receive one of (a) an indication that a first radio access technology (RAT)-based signal is to be transmitted by the first wireless device or (b) a second RAT-based signal from a second wireless device, where each of the first RAT-based signal and the second RAT-based signal interrupts transmission of the energy harvesting signal, and to perform an action to mitigate interruption of the energy harvesting signal.

In another aspect of the disclosure, a method, a computer-readable medium, and an apparatus at a first wireless device are provided. The apparatus may include memory and at least one processor coupled to the memory. The at least one processor, based at least in part on information stored in the memory may be configured to transmit, for an ambient IoT device, a command signal, to perform at least one of a transmission of a first RAT-based signal for a second wireless device or a reception of a second RAT-based signal from the second wireless device, and to perform an action to mitigate interruption of the command signal.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
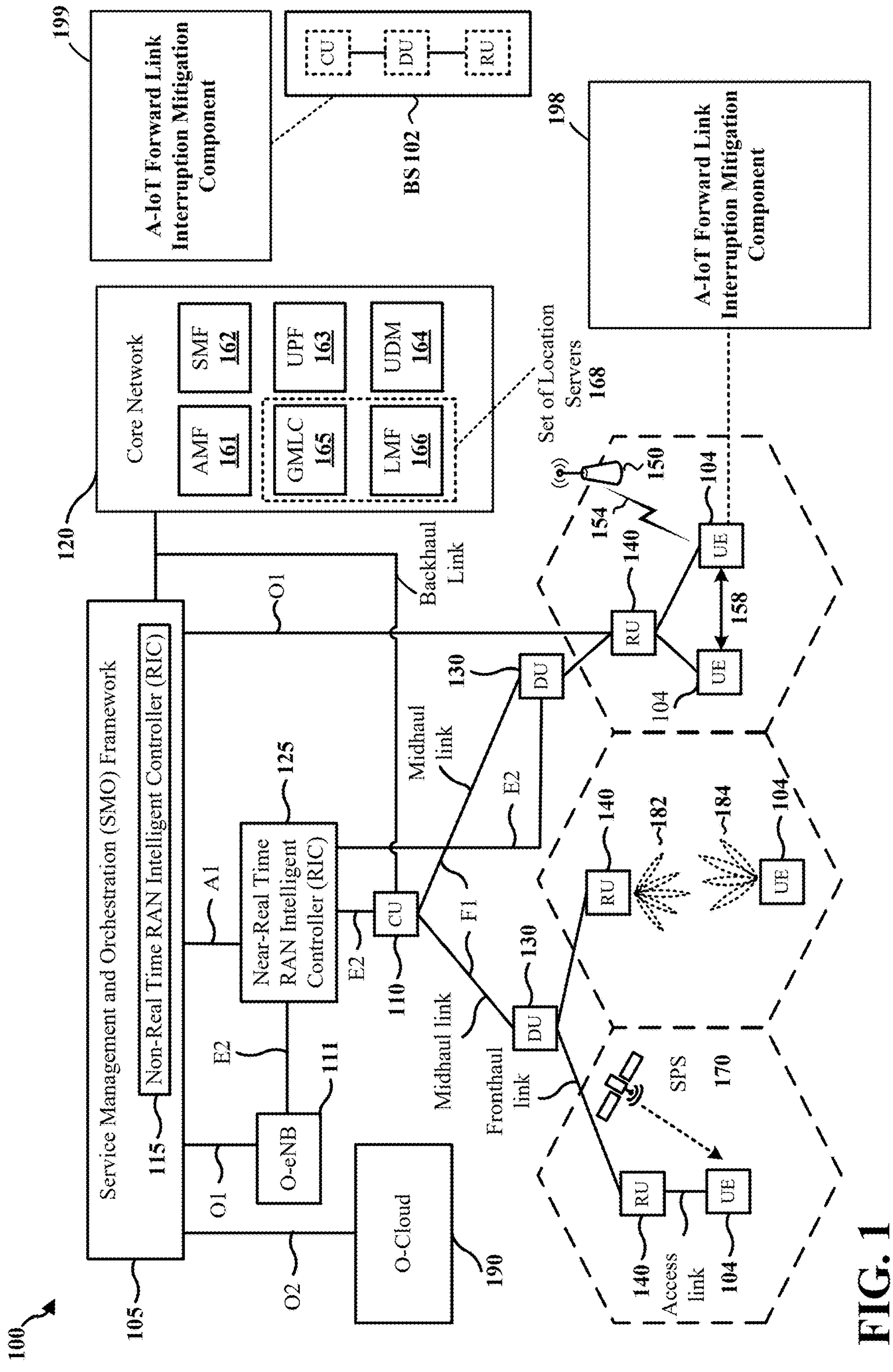
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Various aspects relate generally to communication systems. Some aspects more specifically relate to mitigating ambient IoT (A-IoT) forward link interruptions. In some examples, a first wireless device (e.g., a UE or a network node) may transmit an energy harvesting signal or a command signal to an A-IoT device. Such commands may be interrupted by an NR-based signal (e.g., a downlink signal, an uplink signal, or a sidelink signal) either received by the first wireless device from a second wireless device (e.g., a UE or a network node) or transmitted by the first wireless device to the second wireless device. In some examples, to mitigate an interruption to an energy harvesting signal by an uplink signal, the uplink signal may also be utilized for energy harvesting by the A-IoT device. The first wireless device may utilize additional frequency and/or time resources and/or increase the transmit power when transmitting the uplink signal. To mitigate an interruption to an energy harvesting signal by a downlink signal, the first wireless device may restart or resume the energy harvesting signal after reception of the downlink signal is completed. To mitigate an interruption to a command signal by either an uplink signal or a downlink signal, the first wireless device may indicate the interruption (e.g., via an interruption flag) to the A-IoT device before the interruption occurs and may provide the remaining command signal after the interruption. The interruption indication may assist the A-IoT tag to receive the resumed command after the interruption. Alternatively, for uplink signal-based interruptions to a command signal, the first wireless device may transmit a multiplexed signal to both the second wireless device and the A-IoT device that includes both the uplink signal and the command signal. In such a scenario, the first wireless device may transmit a guard symbol before and/or after the multiplexed signal.

Particular aspects of the subject matter described in this disclosure can be implemented to realize one or more of the following potential advantages. In particular, the mitigation techniques described herein address collisions (e.g., interruptions) between NR-based signals and A-IoT signals by, for example, optimizing the energy harvesting efficiency of an A-IoT device and reducing command transmission failures and retransmissions for the A-IoT device. In some examples, by utilizing additional frequency and/or time resources and/or increasing the transmit power when transmitting an uplink signal for energy harvesting at an A-IoT device, the energy harvesting efficiency at the A-IoT device may be increased. In another example, by transmitting a guard symbol before and/or after the multiplexed signal, demodulation errors at the A-IoT may be prevented.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHZ-300 GHz). Each of these higher frequency bands falls within the EHF band.

With the above aspects in mind, unless specifically stated otherwise, the term “sub-6 GHz” or the like if used herein may broadly represent frequencies that may be less than 6 GHz, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an A-IoT forward link interruption mitigation component 198 that may be configured to transmit, for a first duration, a first portion of an energy harvesting signal to an ambient IoT device, the first duration being less than a total duration for energy harvesting to complete at the ambient IoT device, to receive one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal, and to perform an action to mitigate interruption of the energy harvesting signal. In certain aspects, the A-IoT forward link interruption mitigation component 198 may be configured to transmit, for an ambient IoT device, a command signal, to perform at least one of a transmission of a first RAT-based signal for a second wireless device or a reception of a second RAT-based signal from the second wireless device, and to perform an action to mitigate interruption of the command signal.

In certain aspects, the base station 102 may have a A-IoT forward link interruption mitigation component 199 that may be configured to transmit, for a first duration, a first portion of an energy harvesting signal to an ambient IoT device, the first duration being less than a total duration for energy harvesting to complete at the ambient IoT device, to receive one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal, and to perform an action to mitigate interruption of the energy harvesting signal. In certain aspects, the A-IoT forward link interruption mitigation component 199 may be configured to transmit, for an ambient IoT device, a command signal, to perform at least one of a transmission of a first RAT-based signal for a second wireless device or a reception of a second RAT-based signal from the second wireless device, and to perform an action to mitigate interruption of the command signal.

For the purposes of the present disclosure, a RAT-based signal may be a signal transmitted via radio-based communication network, including, but not limited to LTE, 5G NR, etc.

Figure 2A:
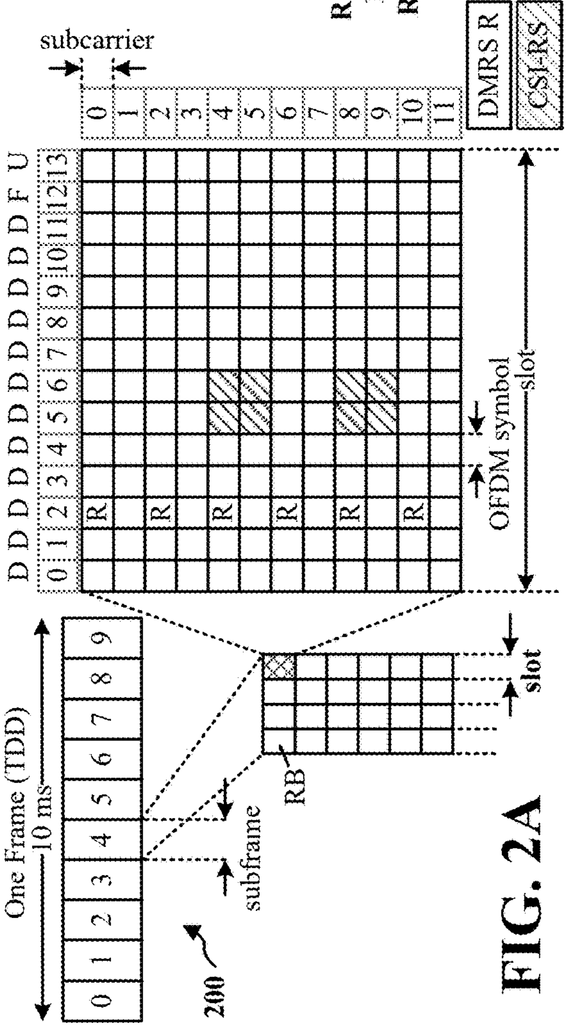
FIG. 2A is a diagram illustrating an example of a first frame, in accordance with various aspects of the present disclosure.
Figure 2B:
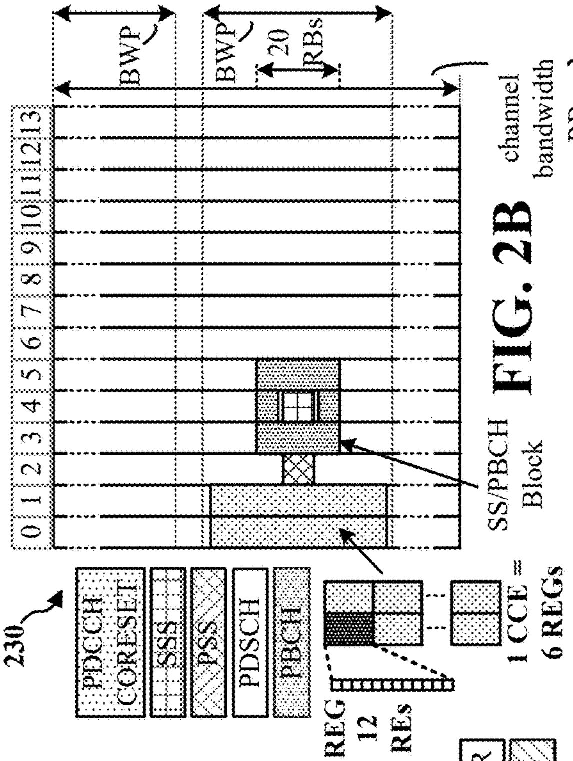
FIG. 2B is a diagram illustrating an example of downlink (DL) channels within a subframe, in accordance with various aspects of the present disclosure.
Figure 2C:
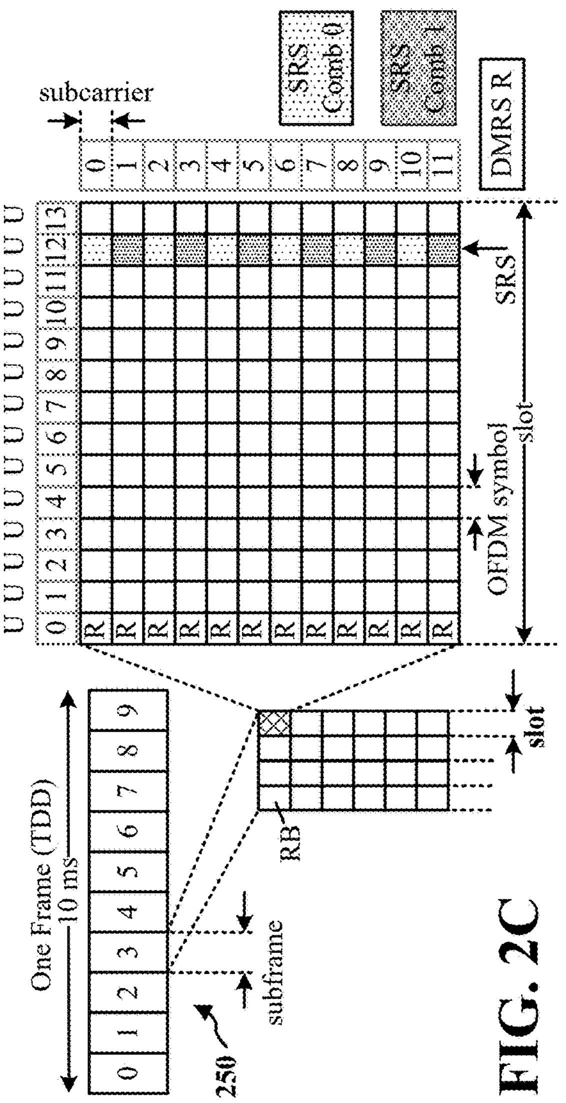
FIG. 2C is a diagram illustrating an example of a second frame, in accordance with various aspects of the present disclosure.
Figure 2D:
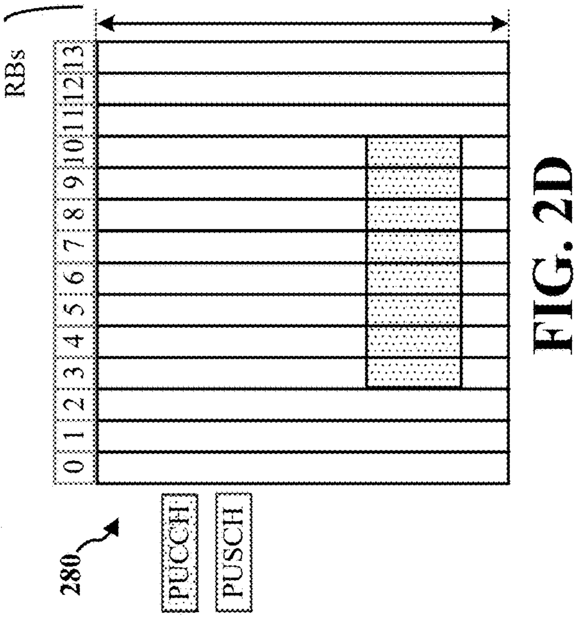
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
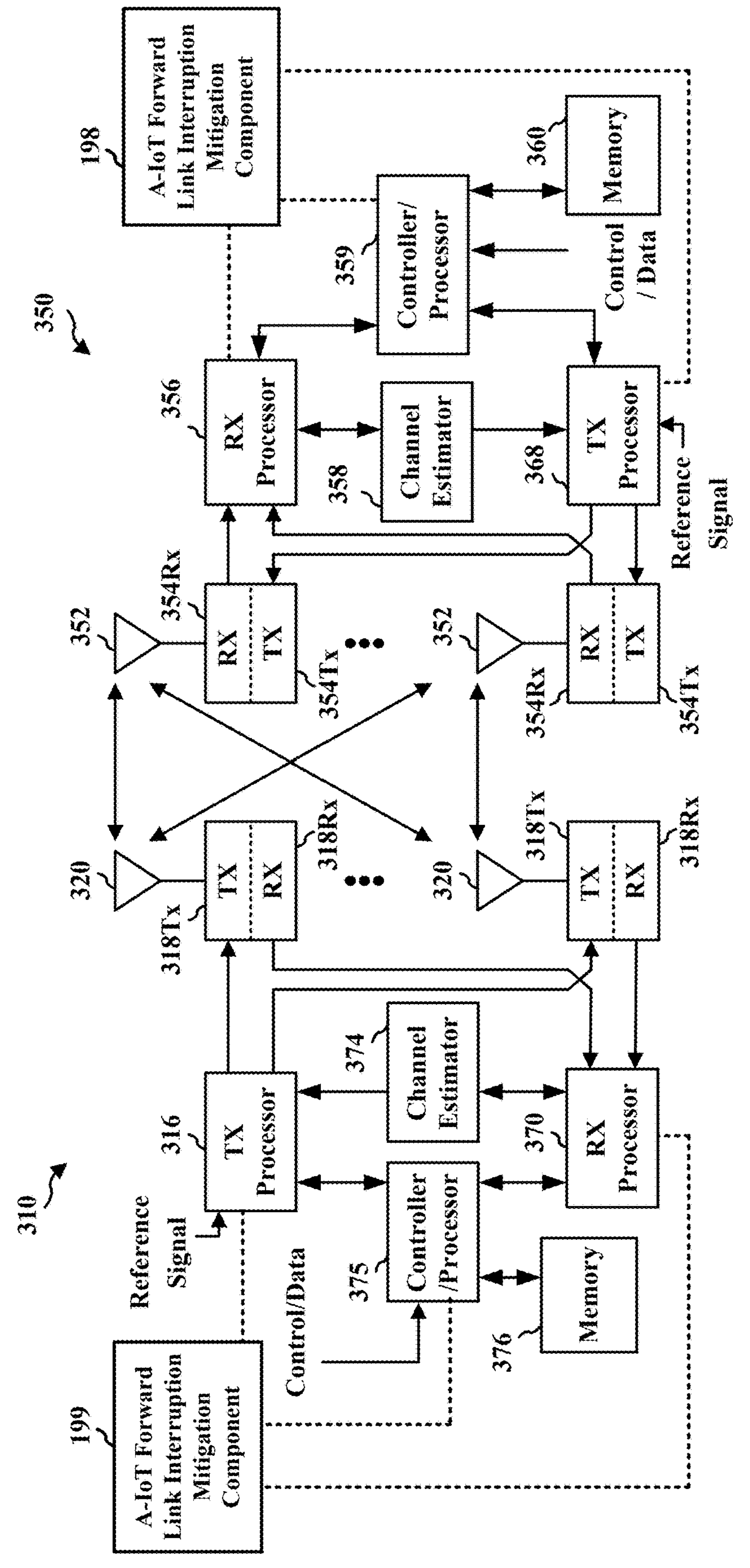
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the A-IoT forward link interruption mitigation component 198 of FIG. 1.

At least one of the TX processor 316, the RX processor 370, and the controller/processor 375 may be configured to perform aspects in connection with the A-IoT forward link interruption mitigation component 199 of FIG. 1.

Passive RF identification (ID) is an industrial technology for electronic tags based on energy harvesting and backscatter communications. Energy harvesting (also known as power harvesting or energy scavenging) may be the process in which energy is collected (e.g., from incident RF signals) from ambient operating environmental energy sources, which is then used to power wireless IoT devices (i.e., it is the process of converting ambient energy into power for a device). Backscatter communications utilize incident RF signals to transmit data without a battery or power grid connection. An RFID device may use an antenna to detect and receive an RF signal (e.g., utilizing peak detection) and may convert it into electricity. The RFID device may use that power to modify and reflect an incident RF signal with encoded data. The incident RF signal may be reflected with modulation utilizing reflection coefficient switching.

Figure 4:
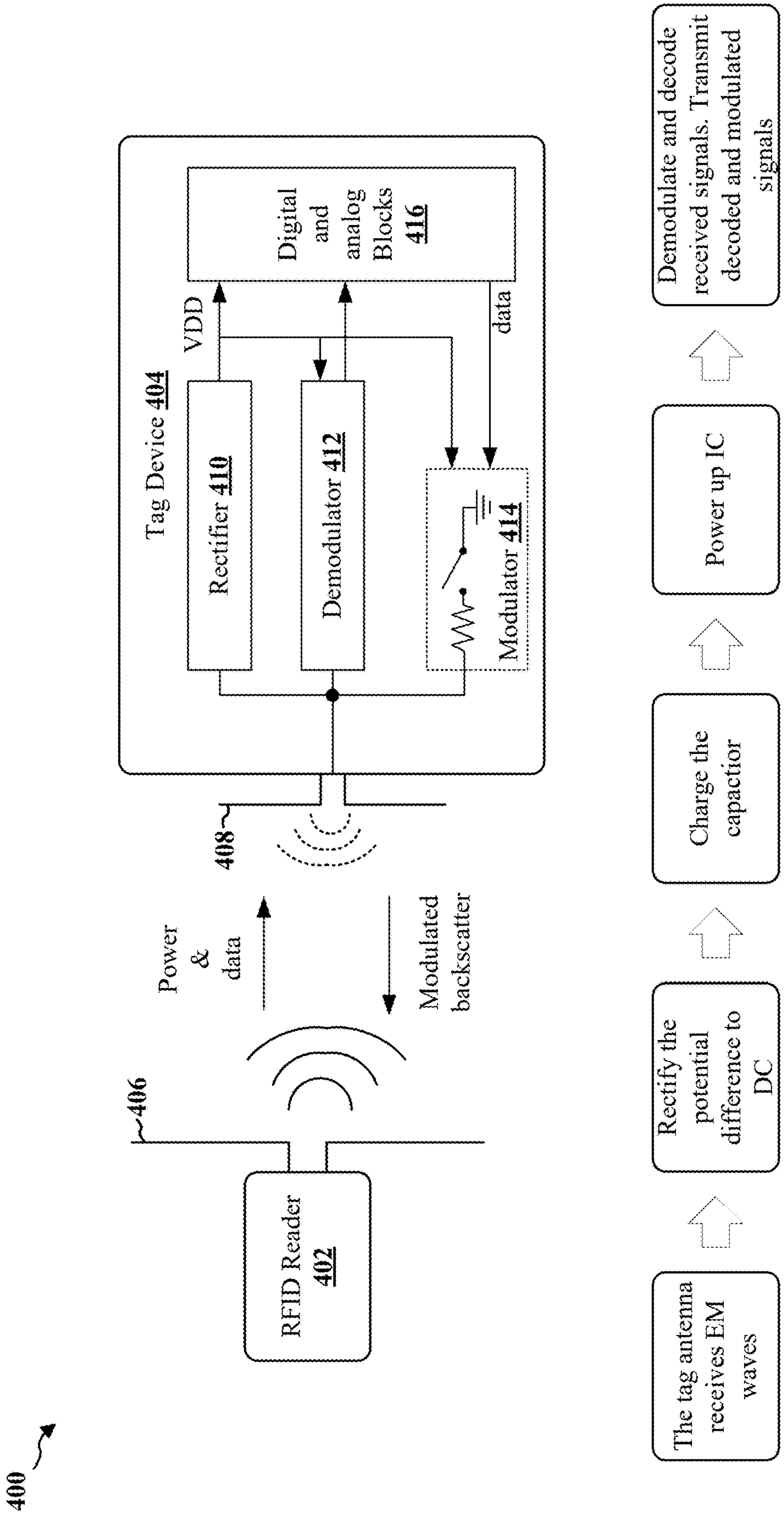
FIG. 4 is diagram illustrating an example radio frequency identification (RFID) system.

FIG. 4 is diagram 400 illustrating an example RFID system. As shown in FIG. 4, the RFID system may include an RFID reader 402 and a passive tag device 404. The RFID reader 402 may include an antenna 406. The passive tag device 404 may include an antenna 408, a rectifier 410, a demodulator 412, a modulator 414, and one or more digital and analog blocks (e.g., circuitry) 416. The passive tag device 404 may be a battery-less backscatter device, which first utilizes signals from the RFID reader 402 to power up. The passive tag device 404 may then decode the signal from the RFID reader 402 and backscatter stored information.

In particular, the antenna 408 of the passive tag device 404 may receive an electromagnetic (EM) wave from the antenna 406 of the RFID reader 402. The rectifier 410 may rectify the potential difference to a direct current (DC), which may be utilized to charge the capacitor (not shown) of the passive tag device 404. The charged capacitor may be utilized to power up the integrated circuit (IC) (e.g., the digital and analog blocks 416) of the passive tag device 404. The demodulator 412 may demodulate the received signals, and the digital and analog blocks 416 may decode the received signals. The modulator 414 may modulate the signals, and the antenna 408 may transmit the decoded and modulated signals to the RFID reader 402.

Ambient IoT devices are 3GPP IoT devices which are smaller and cheaper compared to previous generations of IoT devices, such as narrowband (NB)-IoT devices, LTE-Machine Type (LTE-M) devices, or Reduced Capability (RedCap) devices. The ultimate ambient IoT energy source is that from radio waves. That is, ambient IoT devices are powered by ambient radio waves from the environment and not by a battery. In addition, ambient IoT devices may perform backscatter communications using reflected ambient radio waves and may not include an RF module. Ambient IoT devices may utilize the same technologies as passive ultra-high frequency (UHF) RFID.

Figure 5:
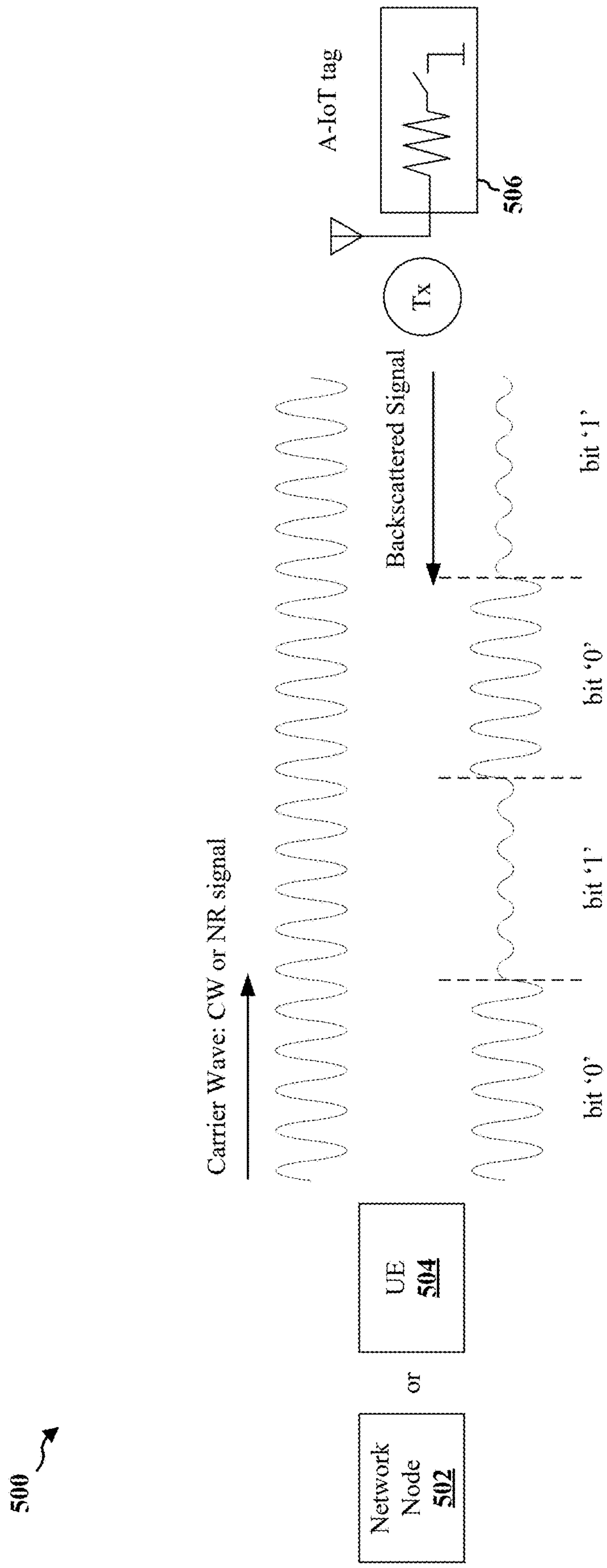
FIG. 5 is a diagram that illustrates an example ambient IoT system.

For example, FIG. 5 is a diagram 500 that illustrates an example A-IoT system. As shown in FIG. 5, the system may include a tag reader (which may be either a network node 502 (e.g., a gNB) or a UE 504) and an ambient IoT tag device 506. The tag reader may transmit a carrier wave (e.g., a continuous wave (CW) or an NR signal). The ambient IoT tag device 506 may transmit a backscattered signal, which may include various bits of data.

Ambient IoT technology may utilize two types of links. One type of link may an A-IoT forward link, which is a tag reader-to-ambient IoT tag device link. A tag reader may transmit a carrier wave to an ambient IoT tag device via the A-IoT forward link. The other type of link may be a backscatter link, which is an ambient IoT tag device-to-tag reader link. An ambient IoT tag device may transmit the backscattered signal to the tag reader via the backscatter link.

Utilizing the A-IoT forward link, a tag reader may transmit energy harvesting signals and commands to ambient IoT tag devices with a much lower spectral efficiency than NR (i.e., OFDM) signals. As such, it may take a longer time to power up ambient IoT devices and/or decode commands. For example, it may take about 1 microsecond to power up an ambient IoT tag device. Command signals may be transmitted via a low-bit modulation scheme, such as amplitude-shift keying (ASK) modulation (e.g., on-off keying (OOK) modulation).

Figure 6:
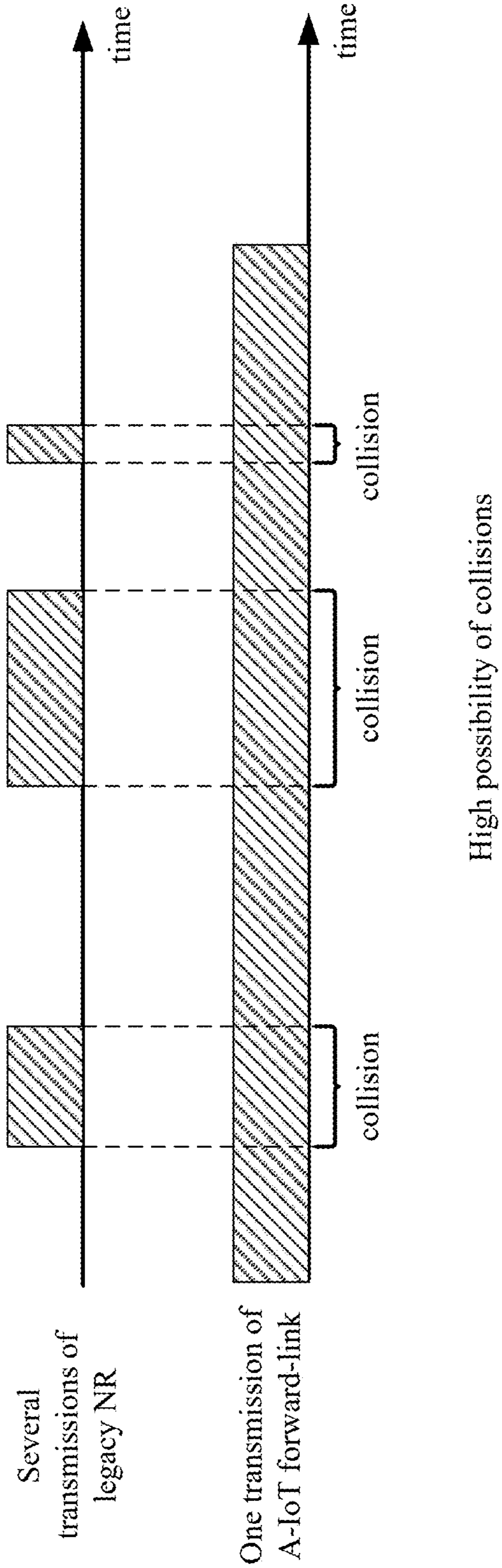
FIG. 6 is a diagram illustrating transmissions via new radio and an ambient IoT forward link.

As described above, a tag reader may be a network node or a UE. Accordingly, a tag reader may be configured to transmit both NR signals and signals via an A-IoT forward link. However, because transmissions via an A-IoT forward link have a lower bit rate than NR-based transmissions, there may be multiple NR transmissions during a single transmission via an A-IoT forward link. For example, FIG. 6 is a diagram 600 illustrating transmissions via NR and an A-IoT forward link. As shown in FIG. 6, multiple NR transmissions may occur during a single transmission via an A-IoT forward link. This may cause several collisions between the NR transmissions and the A-IoT forward link transmission.

Figure 7A:
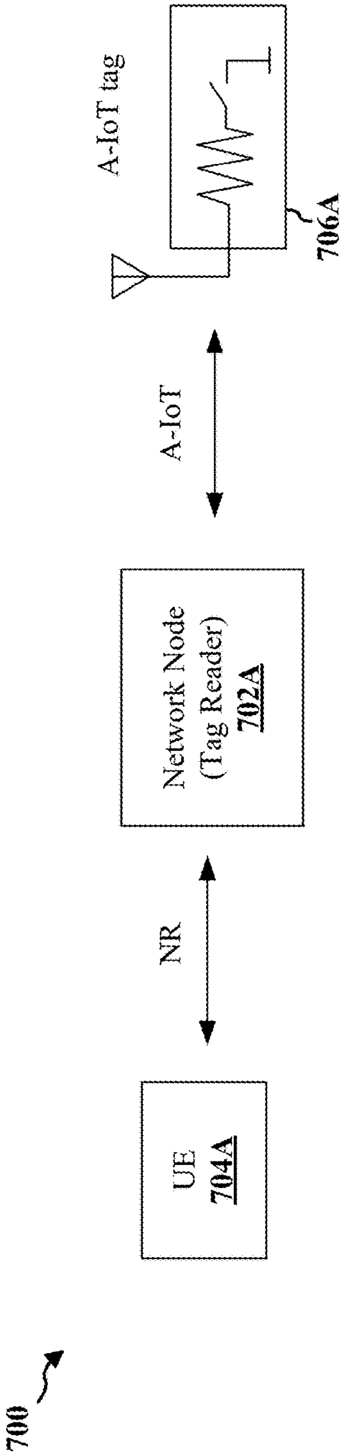
FIG. 7A is a diagram illustrating an ambient IoT system in accordance with various aspects of the present disclosure.
Figure 7B:
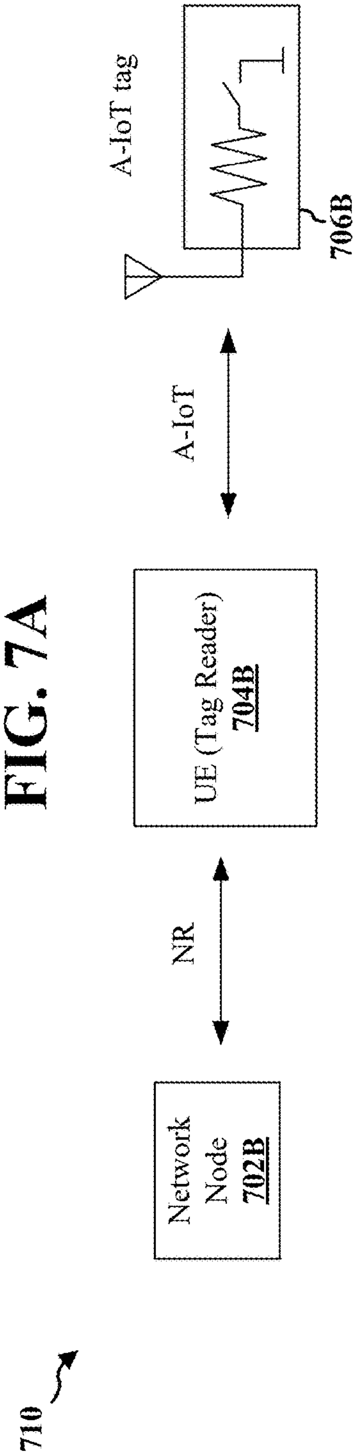
FIG. 7B is a diagram illustrating an ambient IoT system in accordance with various aspects of the present disclosure.
Figure 7C:
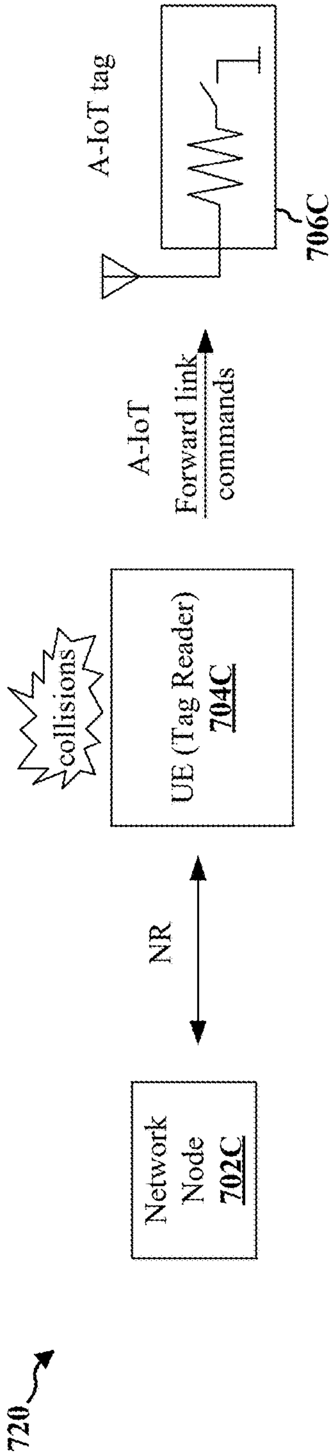
FIG. 7C is a diagram illustrating an ambient IoT system in accordance with various aspects of the present disclosure.

As described above, in A-IoT, a UE or a network node (e.g., a gNB) may be utilized as readers for an A-IoT tag device. For example, FIGS. 7A-7C are diagrams 700, 710, and 720, respectively, illustrating ambient IoT systems in accordance with various aspects of the present disclosure. As shown in FIG. 7A, a network node 702A is used as a tag reader for reading an ambient IoT tag device 706A. The network node 702B also communicates with a UE 704A via NR. As shown in FIG. 7B, a UE 704B is used as a tag reader for reading an ambient IoT tag device 706B. The UE 704B also communicates with a network node 702B via NR.

Collisions may occur when communications of NR and A-IoT occur at the same time. Ambient IoT tag devices may not have receiving frequency selectively due to the simplicity of their hardware, which may not distinguish between different frequencies from readers (e.g., tag receivers are envelope detectors). The NR-to-A-IoT forward link collisions may not be solved by frequency division multiplexing (FDM) with close carrier frequencies. In some aspects, collisions may occur when a reader is transmitting either energy harvesting signals or commands to an ambient IoT tag via the A-IoT forward link at the same time that the reader receives high priority NR-based transmissions from a network node (e.g., periodical reference signal (RS) transmissions, paging transmissions to a UE, etc.). For example, as shown in FIG. 7C, a collision may occur when a UE 704C (which is also configured as a tag reader) transmits a command to the ambient IoT tag device 706C via the A-IoT forward link at the same it receives an NR-based transmission from a network node 702C (e.g., a periodical RS transmission or a paging transmission to the UE 704C).

One potential solution for NR-to-forward link collisions may be to reserve dedicated time resources for the A-IoT forward link, e.g., the last slot per frame. One benefit of such an approach is that it avoids collisions. However, a drawback to such an approach is a low resource utilization rate. Another solution is to utilize priority-based interruption. Readers may have a priority rule or may configure priority to decide whether to interrupt NR-based communications or A-IoT forward link transmissions. When an NR-based communication has a higher priority than an A-IoT forward link transmission, the A-IoT forward link transmission may be interrupted. One benefit of such an approach is a high resource utilization rate. However, a drawback to such an approach is that interruptions may need to be handled when collisions occur.

Various aspects of the present disclosure are directed to techniques for addressing different types of interruptions to an A-IoT forward link transmission by NR-based communications (e.g., uplink signals and downlink signals), in the co-existence of an NR and A-IoT system. Such techniques may reduce influences of NR-to-A-IoT forward link interruption, may reduce command transmission failures/retransmissions, and may reduce energy harvesting efficiency decline. In one example, an uplink signal may be used by the A-IoT device for energy harvesting (e.g., charging). In another example, during reception of a downlink signal, the A-IoT device may deactivate itself. The A-IoT reader may provide interruption start and stop signaling to the A-IoT device. The interrupted A-IoT communication may be restarted or resumed after the interruption is over. It is noted that while the aspects described herein may be in reference to a UE configured as a tag reader, the aspects described herein are also applicable for a network node (e.g., a gNB) configured as a tag reader. It is further noted that while the aspects described herein may be in reference to interruptions by NR-based uplink and downlink signals, the aspects described herein are also applicable for interruptions by sidelink (SL) signals (e.g., for UE-to-UE communication).

Figure 8A:
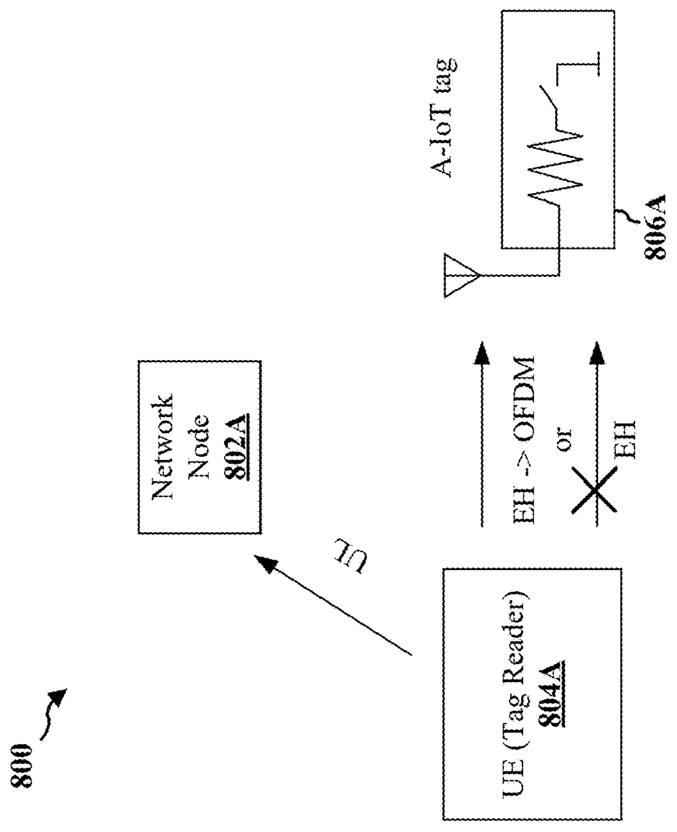
FIG. 8A is a diagram illustrating an energy harvesting signal interruption.

There may be two different types of A-IoT forward link interruptions. One type of interruption may be an interruption to an energy harvesting signal transmission by an uplink signal. For example, FIG. 8A is a diagram 800 illustrating an energy harvesting signal interruption. As shown in FIG. 8A, the UE 804A (which is also configured as a tag reader) may transmit an energy harvesting signal to the ambient IoT tag device 806A. During the transmission of the energy harvesting signal, the UE 804A may transmit an uplink signal to a network node 802A. The uplink signal may interrupt the energy harvesting signal. For interruptions to energy harvesting signals, when the energy harvesting is interrupted by an uplink transmit signal (e.g., NR-Tx (UL)), the UE transmitting waveform may change, and a charging time enhancement may be implemented to overcome the energy harvesting efficiency decline. For example, for uplink transmissions, the UE 804A may transmit an OFDM waveform, whereas the energy harvesting signal waveform may not be an OFDM waveform (e.g., it may be a dedicated waveform for charging, etc.). When an energy harvesting signal is interrupted, the uplink OFDM waveform may be utilized to charge the ambient IoT tag device 806A. When the energy harvesting signal transmission is interrupted by a downlink receive signal (e.g., NR-Rx (DL), the UE 804A may retransmit the energy harvesting signal after the interruption with a dynamic charging time.

Figure 8B:
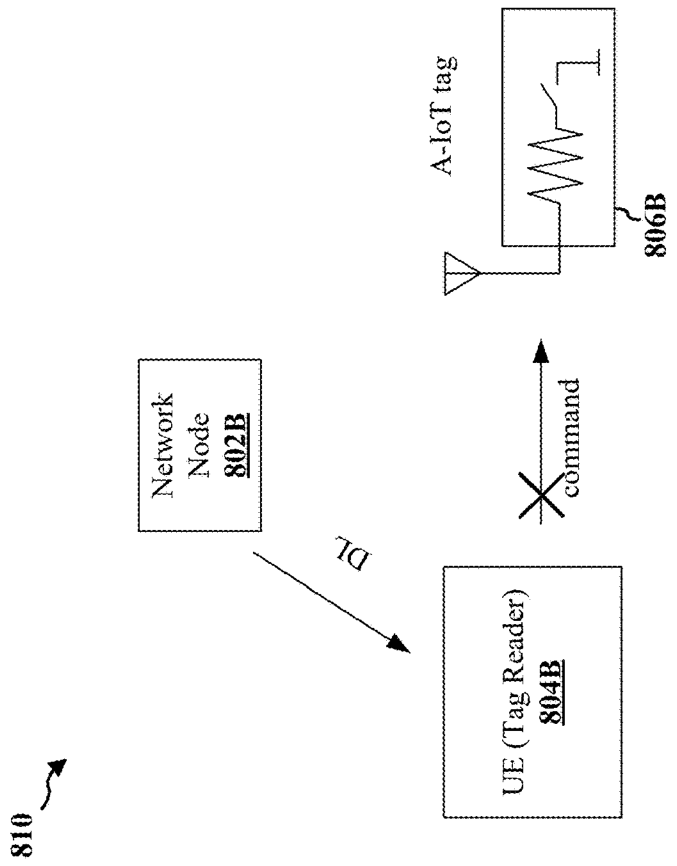
FIG. 8B is a diagram illustrating a command signal interruption.

Another type of interruption may be an interruption to a command signal. For example, FIG. 8B is a diagram 810 illustrating a command signal interruption. As shown in FIG. 8B, the UE 804B (which may also be configured as a tag reader) may transmit a command signal to the ambient IoT tag device 806B. During the transmission of the command signal, the UE 804B may transmit an uplink signal to or receive a downlink signal (as shown in FIG. 8B) from a network node 802B. The uplink or downlink signal may interrupt the command signal. The UE 804B may indicate one or more A-IoT tag interruption flags to assist the ambient IoT tag device 806B to resume the reception of the command after the interruption.

Figure 9:
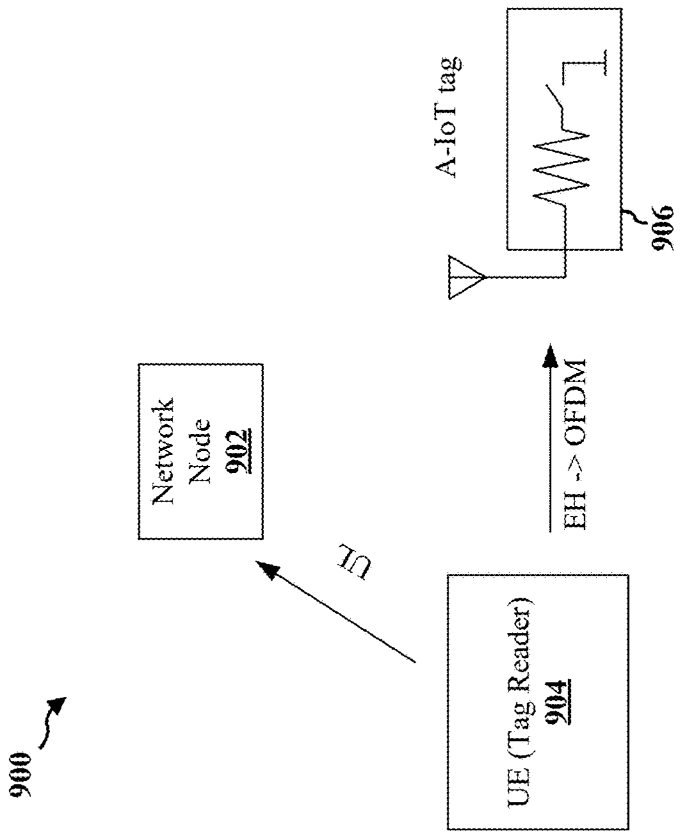
FIG. 9 is a diagram illustrating an interruption of an energy harvesting signal by an uplink signal in accordance with various aspects of the present disclosure.

Additional details for interruptions to energy harvesting signals by uplink and downlink signals are described as follows. An ambient IoT device may still be charged by uplink signals. However, the energy harvesting efficiency at the ambient IoT device may decrease when a tag reader (e.g., a UE) changes an energy harvesting signal to a UL signal. This is assuming that energy harvesting signal uses an optimal waveform with the highest energy harvesting efficiency. For example, FIG. 9 is a diagram 900 illustrating an interruption of an energy harvesting signal by an uplink signal in accordance with various aspects of the present disclosure. As shown in FIG. 9, a UE 904 (which may also be configured as a tag reader) may transmit an energy harvesting signal to an ambient IoT tag device 906. While transmitting the energy harvesting signal, the UE 904 may transmit an uplink signal to a network node 902. The uplink signal may be an OFDM signal, which may also be received by the ambient IoT tag device 906. The OFDM signal received by the ambient IoT tag device 906 may be used for energy harvesting at the ambient IoT tag device 906.

There may be multiple options for handling an interruption of an energy harvesting signal by an uplink signal, while also increasing the energy harvesting efficiency/time when utilizing an uplink OFDM signal for energy harvesting at the ambient IoT tag device 906. One option is that the UE 904 may request more frequency/time resources from the network node (e.g., a gNB) to increase energy harvesting efficiency/time. For additional frequency resources, the UE 904 may combine other RBs/REs and uplink resources to optimize the overall waveform to increase the energy harvesting efficiency. For additional time resources, the UE may charge the ambient IoT tag device 906 for a longer time to overcome energy harvesting efficiency reduction.

Another option is that the network node 902 may allocate, for the UE 904, more resources for the uplink signal with a collision with an energy harvesting signal transmission. The network node 902 may previously determine the resources for energy harvesting signal transmission by the UE 904 (e.g., by pre-configurations by the network node 902 or pre-indications from the UE 904).

A further option is that the UE 904 may transmit the uplink signal with a larger or full transmit power, which increases the energy harvesting efficiency for the ambient IoT tag device 906. An indication of the increase in power may be indicated (e.g., signaled) to the network node 902. Network node coordination may be utilized to avoid interference with another UE.

Figure 10:
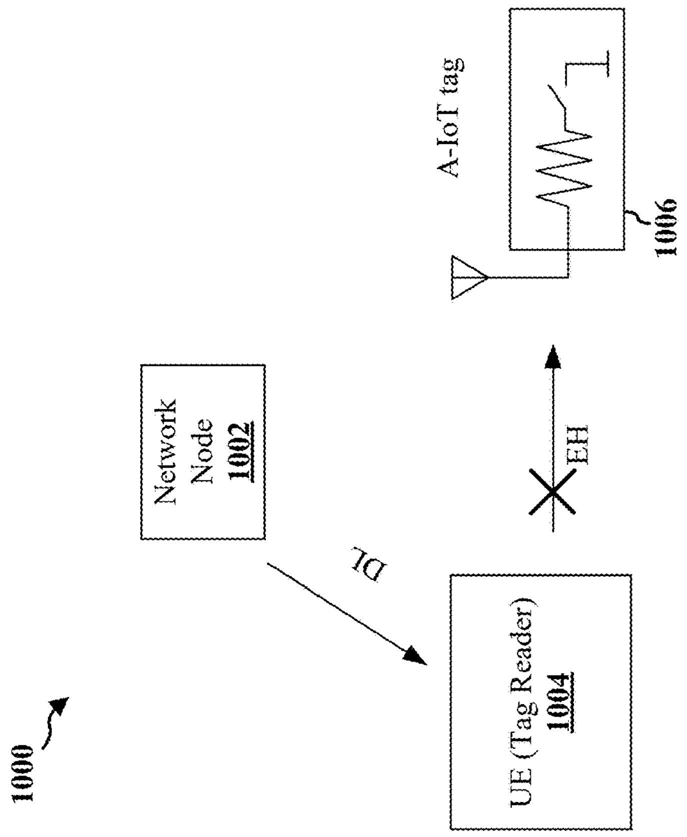
FIG. 10 is a diagram illustrating an interruption of an energy harvesting signal by a downlink signal in accordance with various aspects of the present disclosure.

When receiving a downlink signals, a UE may be unable to transmit energy harvesting signals. As such, the transmission of the energy harvesting signal may be interrupted when receiving a downlink signal. For example, FIG. 10 is a diagram 1000 illustrating an interruption of an energy harvesting signal by a downlink signal in accordance with various aspects of the present disclosure. As shown in FIG. 10, a UE 1004 (which is also configured as a tag reader) may transmit an energy harvesting signal to an ambient IoT tag device 1006. While transmitting the energy harvesting signal, the UE 1004 may receive a downlink signal from a network node 902. Upon receiving the downlink signal, the UE 1004 may interrupt (e.g., halt or pause) transmission of the energy harvesting signal.

There may be multiple options for handling an interruption of an energy harvesting signal by a downlink signal. One option is that the UE 1004 may restart (e.g., re-initiate) the energy harvesting signal transmission after receiving the downlink signal. In such a scenario, the duration of the restarted energy harvesting signal transmission may be equal to the full (e.g., entire) time for the ambient IoT tag device 1006 to complete energy harvesting.

Another option is that the UE 1004 may resume the energy harvesting signal transmission after receiving the downlink signal if the duration of the downlink signal is less than a maximum allowed time of the energy harvesting interruption. The duration of the resumption of the energy harvesting signal transmission may be equal to the remaining time for energy harvesting to be completed at the ambient IoT device. The remaining time may be equal to the difference between the full time for the ambient IoT tag device 1006 to complete energy harvesting and the duration of the transmission of the energy harvesting signal prior to receiving the downlink signal.

A further option is that the UE 1004 may resume the energy harvesting signal transmission after receiving the downlink signal if the duration of the downlink signal is less than a maximum allowed time of the energy harvesting interruption, where the duration of the resumption of the energy harvesting signal transmission is less than the remaining time described above. The duration of the resumption of the energy harvesting signal transmission may depend on the duration of the downlink signal. The smaller the duration of the interruption by the downlink signal, the smaller the duration of time for the resumption of the energy harvesting signal transmission.

Figure 11:
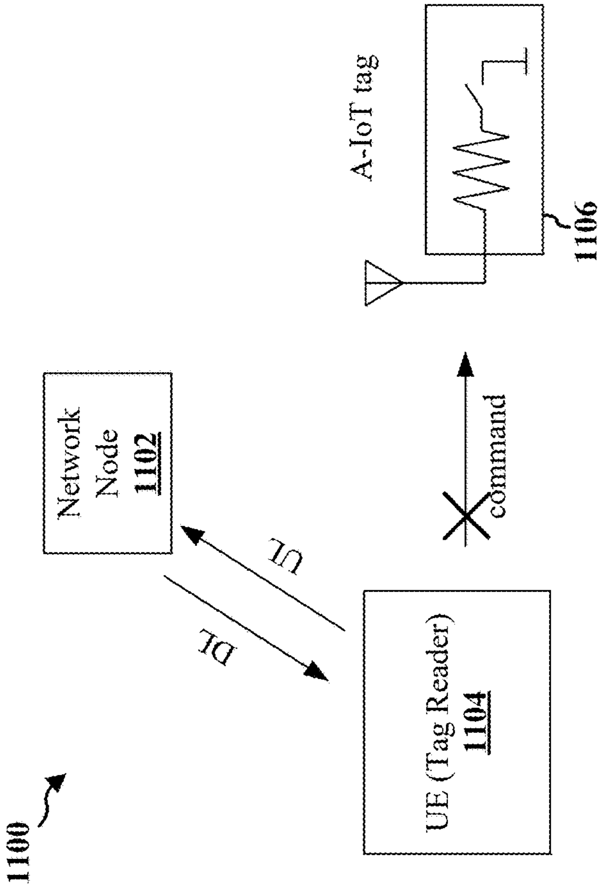
FIG. 11 is a diagram illustrating a command signal interruption.

Additional details for interruptions to command signals by uplink and downlink signals are described as follows. A UE may indicate an upcoming interruption to an ambient IoT tag device in the command signal before the interruption occurs. For example, FIG. 11 is a diagram 1100 illustrating a command signal interruption. As shown in FIG. 11, a UE 1104 (which may also be configured as a tag reader) may transmit a command signal to an ambient IoT tag device 1106. During the transmission of the command signal, the UE 1104 may transmit an uplink signal to or receive a downlink signal from a network node 1102. The uplink or downlink signal may interrupt the command signal. In one aspect, the UE 1104 may transmit to the ambient IoT tag device 1106 a pair of an interruption-start flag (before the interruption) and an interruption-end flag (after the interruption). The interruption-start flag may include the interruption time (i.e., a duration for the interruption). Thus, the ambient IoT tag device 1106 may wait for a while (e.g., greater than or equal to the specified duration) and then search for the interruption-end flag. Alternatively, the interruption-start flag may not include the interruption time. Thus, the ambient IoT tag device 1106 may continue searching for the interruption-end flag (e.g., until it is received or after expiration of a preconfigured time period). In another aspect, the UE 1104 may send the ambient IoT tag device 1106 just an interruption-start flag before the interruption. The remaining command signal may be initiated with a legacy preamble.

Figure 12:
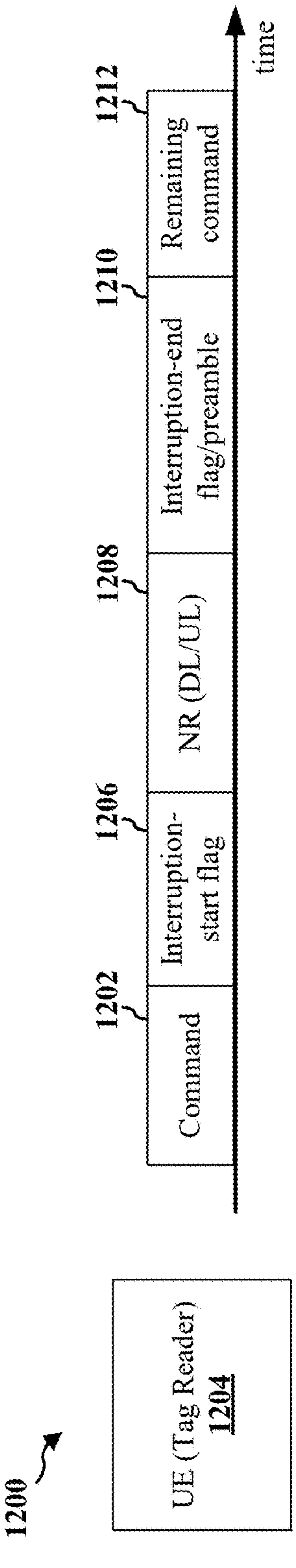
FIG. 12 is a diagram illustrating the signaling of an interruption of a command signal in accordance with various aspects of the present disclosure.

For instance, FIG. 12 is a diagram 1200 illustrating the signaling of an interruption of a command signal in accordance with various aspects of the present disclosure. As shown in FIG. 12, a UE 1204 (that may also be configured as a reader) may transmit a first portion 1202 of a command. The UE 1204 may also transmit an interruption-start flag 1206 to indicate to an ambient IoT tag device that the command is to be interrupted. The interruption-start flag 1206 may include an interruption time, as described above. The UE 1204 may then perform an NR-based communication 1208 by either transmitting an uplink signal or receiving a downlink signal. After the NR-based communication 1208 is complete, the UE 1204 may transmit an interruption-end flag and/or a preamble 1210, which indicates to the ambient IoT device that the NR-based communication is complete and/or that the remaining portion 1212 of the command is to be transmitted. The UE 1204 may then transmit the remaining portion 1212 of the command.

In some aspects, the UE may send an energy harvesting signal before the interruption-end flag and/or preamble, followed by the remaining portion of the command signal. This may be performed for a scenario in which the power of the ambient IoT tag device drops during the interruption. The time duration of the energy harvesting signal may depend on the interruption time (i.e., the duration of the interruption) and whether the command is interrupted by a downlink signal or an uplink similar (in a similar manner as described above with reference to energy harvesting signal interruptions).

Triggered by the interruption-start flag, the ambient IoT tag device may store the received command signal in a memory thereof (e.g., a read-only memory (ROM), an electrically erasable programmable ROM (EEPROM), and/or any other memory device that maintains data in the event of power loss). Triggered by the interruption-end flag and/or preamble, the ambient IoT tag device may read the portion of the command stored in the memory and connect it with the command signal received after the interruption-end flag and/or preamble. That is, the ambient IoT tag device may combine the stored portion of the command and the portion of the command received after the interruption-end flag and/or preamble and/or analyze the stored portion of the command with respect to the portion of the command received after the interruption-end flag and/or preamble.

Figure 13:
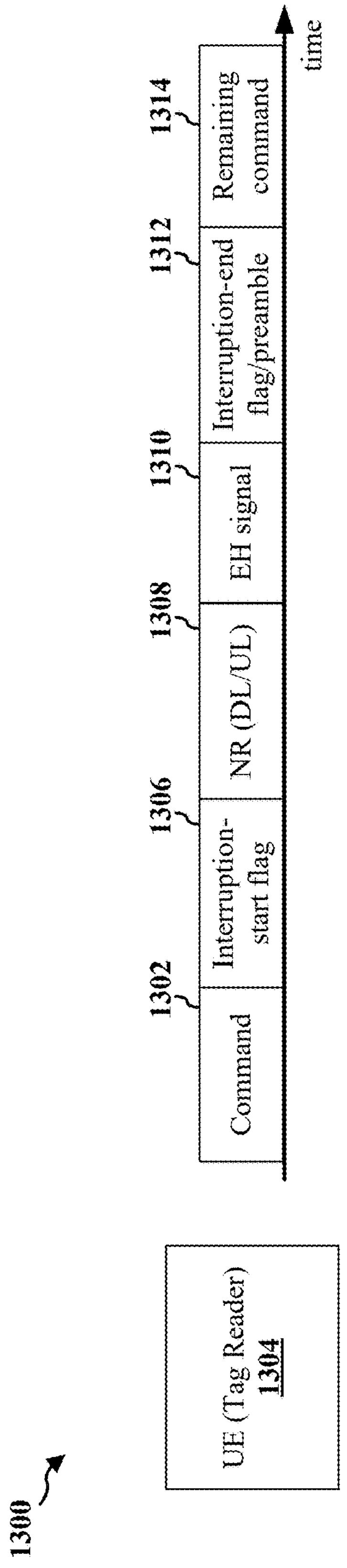
FIG. 13 is a diagram illustrating the signaling of an energy harvesting signal during the interruption of a command signal in accordance with various aspects of the present disclosure.

FIG. 13 is a diagram 1300 illustrating the signaling of an energy harvesting signal during the interruption of a command signal in accordance with various aspects of the present disclosure. As shown in FIG. 13, a UE 1304 (that may also be configured as a reader) may transmit a first portion 1302 of a command. The UE 1304 may also transmit an interruption-start flag 1306 to indicate to an ambient IoT tag device that the command is to be interrupted. The interruption-start flag 1306 may include an interruption time, as described above. The UE 1304 may then perform an NR-based communication 1308 by either transmitting an uplink signal or receiving a downlink signal. The UE 1304 may also transmit an energy harvesting signal 1310, which the ambient IoT device utilizes for energy harvesting. The UE 1304 may then transmit an interruption-end flag and/or a preamble 1312, which indicates to the ambient IoT device that the NR-based communication is complete and/or that the remaining portion 1314 of the command is to be transmitted. The UE 1304 may then transmit the remaining portion 1314 of the command. The ambient IoT tag device, upon receiving the interruption-end flag and/or preamble 1312, may read the first portion 1302 of the command from its memory and combine the first portion 1302 with (and/or analyze the first portion 1302 with respect to) the remaining portion 1314.

In some aspects, the UE may send a continuous wave (e.g., a carrier wave signal) before the remaining command signals, which enables the ambient IoT tag device to report whether it has stored the command signal (or if the ambient IoT tag device has not been powered off) before the interruption). If the command has been stored (or if the ambient IoT tag device has not been powered off), the UE just transmits the remaining command. Otherwise, the UE retransmits the whole command.

Figure 14:
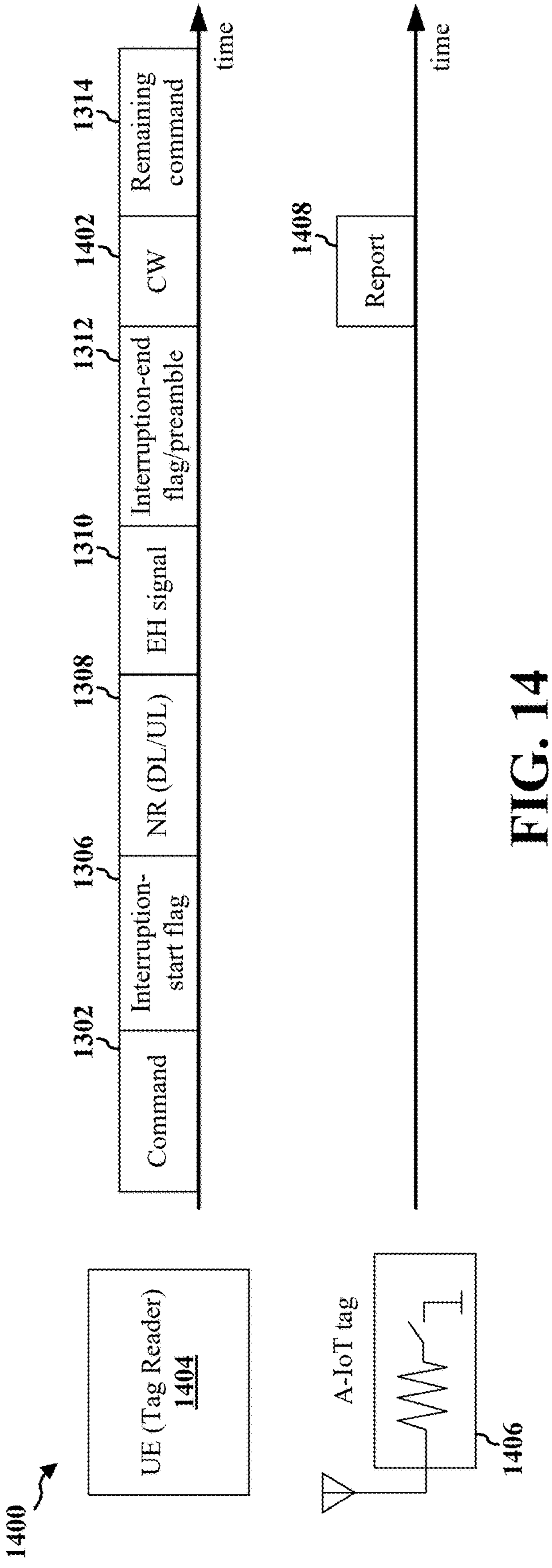
FIG. 14 is a diagram illustrating the transmission of a continuous wave during the interruption of a command in accordance with various aspects of the present disclosure.

For example, FIG. 14 is a diagram 1400 illustrating the transmission of a continuous wave during the interruption of a command in accordance with various aspects of the present disclosure. As shown in FIG. 14, after a UE 1404 transmits the interruption-end flag and/or preamble 1312, the UE 1404 may transmit a continuous wave 1402. The continuous wave 1402 may enable an ambient IoT tag device 1406 that receives the continuous wave 1402 to transmit a report 1408, which indicates whether the ambient IoT tag device 1406 has stored the first portion 1302 of the command before the interruption.

In some aspects, A-IoT forward link command interruptions by an uplink signal may be rectified using multiplexing waveforms. For example, the UE may utilize multiplexing waveforms based on an uplink signal and an A-IoT forward link command transmitted during uplink transmission to keep command transmissions without interruptions. This way, the UE may transmit an uplink signal to a network node and commands to an ambient IoT tag device using the same signal. For example, the uplink signal waveform may be an OFDM waveform, and the A-IoT forward link command may be an OOK-based waveform. The multiplexing waveform may be based on both OOK modulation and OFDM. The UE may be configured by different RRC resource patterns by the network node, via RRC indications, to trigger the switching of the dedicated command waveform and the multiplexing waveform. Guard symbols may be added between the dedicated waveform and the multiplexing waveform to enable the ambient IoT tag device to adapt to the change of waveform and avoid demodulation errors.

Figure 15:
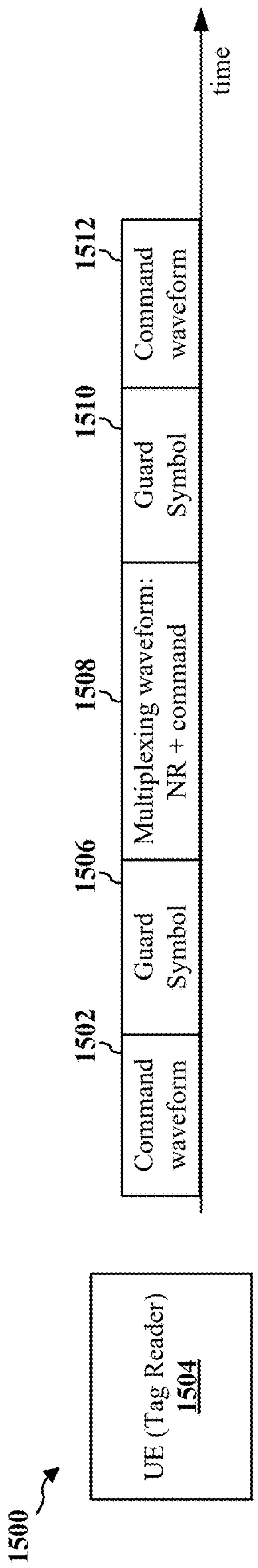
FIG. 15 is a diagram illustrating the transmission of a multiplexing waveform in accordance with various aspects of the present disclosure.

For example, FIG. 15 is a diagram 1500 illustrating the transmission of a multiplexing waveform in accordance with various aspects of the present disclosure. As shown in FIG. 15, a UE 1504 (which may also be configured as a tag reader) may transmit a command waveform 1502 corresponding to an A-IoT forward link command signal. After transmitting the command waveform 1502, the UE 1504 may transmit a guard symbol 1506. After transmitting the guard symbol 1506, the UE 1504 may transmit a multiplexing waveform 1508 that includes both an uplink signal and an A-IoT forward link command signal. After transmission of the multiplexing waveform 1508, the UE 1504 may transmit another guard symbol 1510. The UE 1504 may then transmit another command waveform 1512 after the guard symbol 1510.

In some aspects, for downlink or uplink signal-based interruptions of an A-IoT forward link command, a network node (e.g., a gNB) may modify the corresponding DCI with a larger time gap between the DCI and the downlink signal or uplink signal to reserve enough time for the UE to indicate to the ambient IoT device the interruption-start flag (e.g., the interruption-start flag 1206 or 1306). For instance, the network node, for downlink signal-based interruptions, may set an increased value for the $k_0$ parameter, which defines a first slot offset between a slot in which a PDCCH is received and a slot in which a PDSCH is received. For uplink signal-based interruptions, the network node set an increased value for the $k_2$ parameter, which defines a second slot offset between a slot in which the PDCCH is received and a slot in which uplink data is to be transmitted on a PUSCH.

Figure 16:
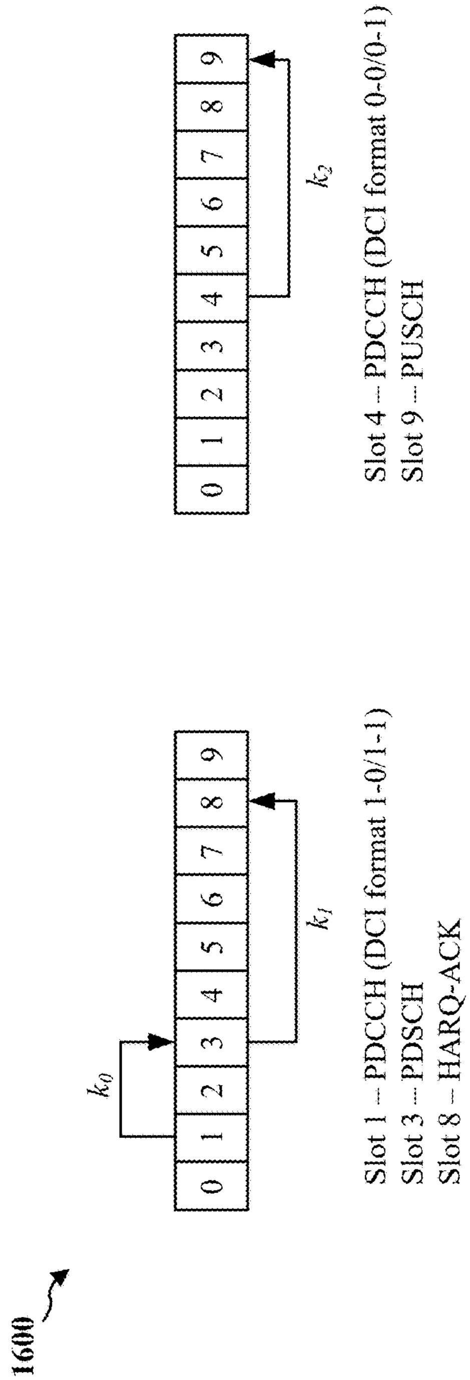
FIG. 16 is a diagram illustrating slot offset parameters in accordance with various aspects of the present disclosure.

For example, FIG. 16 is a diagram 1600 illustrating slot offset parameters in accordance with various aspects of the present disclosure. As shown in FIG. 16, the $k_0$ parameter defines a first slot offset between a slot (Slot 1) in which a PDCCH is received and a slot (Slot 3) in which a PDSCH is received. The $k_2$ parameter defines a slot offset between a slot (Slot 4) in which the PDCCH is received and a slot (Slot 9) in which uplink data is to be transmitted on a PUSCH.

In some aspects, the network node may achieve the larger time gap between the DCI and the downlink or uplink signal by increasing the maximum value of the $k_0$ and $k_2$ parameters to provide enough time for the UE to indicate the interruption-start flag. In other aspects, the network node may achieve the larger time gap between the DCI and the downlink or uplink signal by utilizing different parameters (e.g., $k_0'$ and $k_2'$) that are set to the larger values than the maximum values for the $k_0$ and $k_2$ parameters in DCI, for example, for a UE that is also configured as a tag reader.

Figure 17:
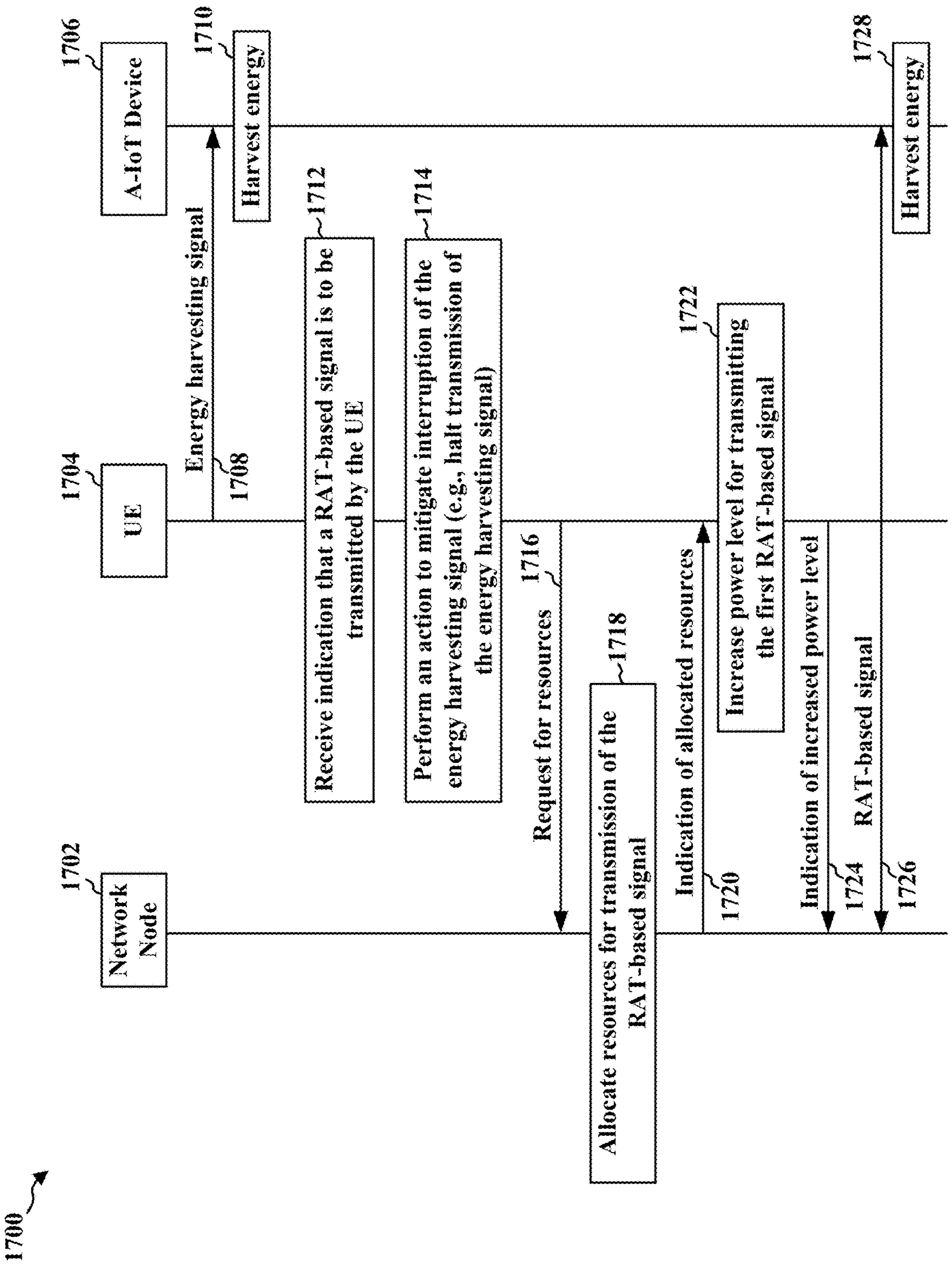
FIG. 17 is a call flow diagram illustrating a method of wireless communication in accordance with various aspects of this present disclosure.

FIG. 17 depicts a call flow diagram 1700 illustrating a method of wireless communication in accordance with various aspects of this present disclosure. In particular, diagram 1700 illustrates a method for mitigating an interruption of an energy harvesting signal by an uplink signal. As shown in FIG. 17, the diagram 1700 includes a network node 1702, a UE 1704, and an ambient IoT device 1706. The network node 1702 may be an example of the base station 102, the base station 310, the network node 502, the network node 702A, the network node 702B, the network node 702C, the network node 802A, the network node 802B, the network node 902, the network node 1002, or the network node 1102. The UE 1704 may be an example of the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, or the UE 1504. The ambient IoT device 1706 may be an example of the ambient IoT tag device 506, the ambient IoT tag device 706A, the ambient IoT tag device 706B, the ambient IoT tag device 706C, the ambient IoT tag device 806A, the ambient IoT tag device 806B, the ambient IoT tag device 906, the ambient IoT tag device 1006, the ambient IoT tag device 1106, or the ambient IoT tag device 1406. Although aspects are described for the network node 1702, the aspects may be performed by the network node 1702 in aggregation and/or by one or more components of the network node 1702 (e.g., such as a CU 110, a DU 130, and/or an RU 140). As shown in FIG. 17, at 1708, the UE 1704 may transmit, for a first duration, a first portion of an energy harvesting signal to the ambient IoT device 1706. The first duration may be less than a total duration for energy harvesting to complete at the ambient IoT device 1706.

At 1710, the ambient IoT device 1706 may harvest energy based on the first portion of the energy harvesting signal received at 1708.

At 1712, the UE 1704 may receive (e.g., obtain) an indication that a RAT-based signal (e.g., an uplink signal) is to be transmitted by the UE 1704. For example, the UE 1704 may obtain an indication in response to a determination that a resource for uplink transmission is available, in response to a determination that data has been buffered for transmission, etc.). The RAT-based signal may interrupt transmission of the energy harvesting signal.

At 1714, the UE 1704 may perform an action to mitigate interruption of the energy harvesting signal. For example, in some aspects, the UE 1704 may pause transmission of the energy harvesting signal.

In some aspects, at 1716, the UE 1704 may transmit a request, to the network node 1702, for resources for transmitting the RAT-based signal. At 1718, the network node 1702 may allocate resources for transmission of the RAT-based signal. At 1720, the network node 1702 may provide an indication of the allocated resources to the UE 1704.

In some aspects, at 1722, the UE 1704 may increase a power level (e.g., of an antenna of the UE 1704) for transmitting the RAT-based signal.

In some aspects, at 1724, the UE 1704 may transmit, to the network node 1702, an indication of the increased power level.

At 1726, the UE 1704 may transmit the RAT-based signal based on the resources allocated by the network node 1702 and/or the increased power level. The RAT-based signal may be received by both the network node 1702 and the ambient IoT device 1706. The RAT-based signal may be configured to enable energy harvesting at the ambient IoT device 1706.

At 1728, the ambient IoT device 1706 may harvest energy based on the RAT-based signal received at 1726.

Figure 18:
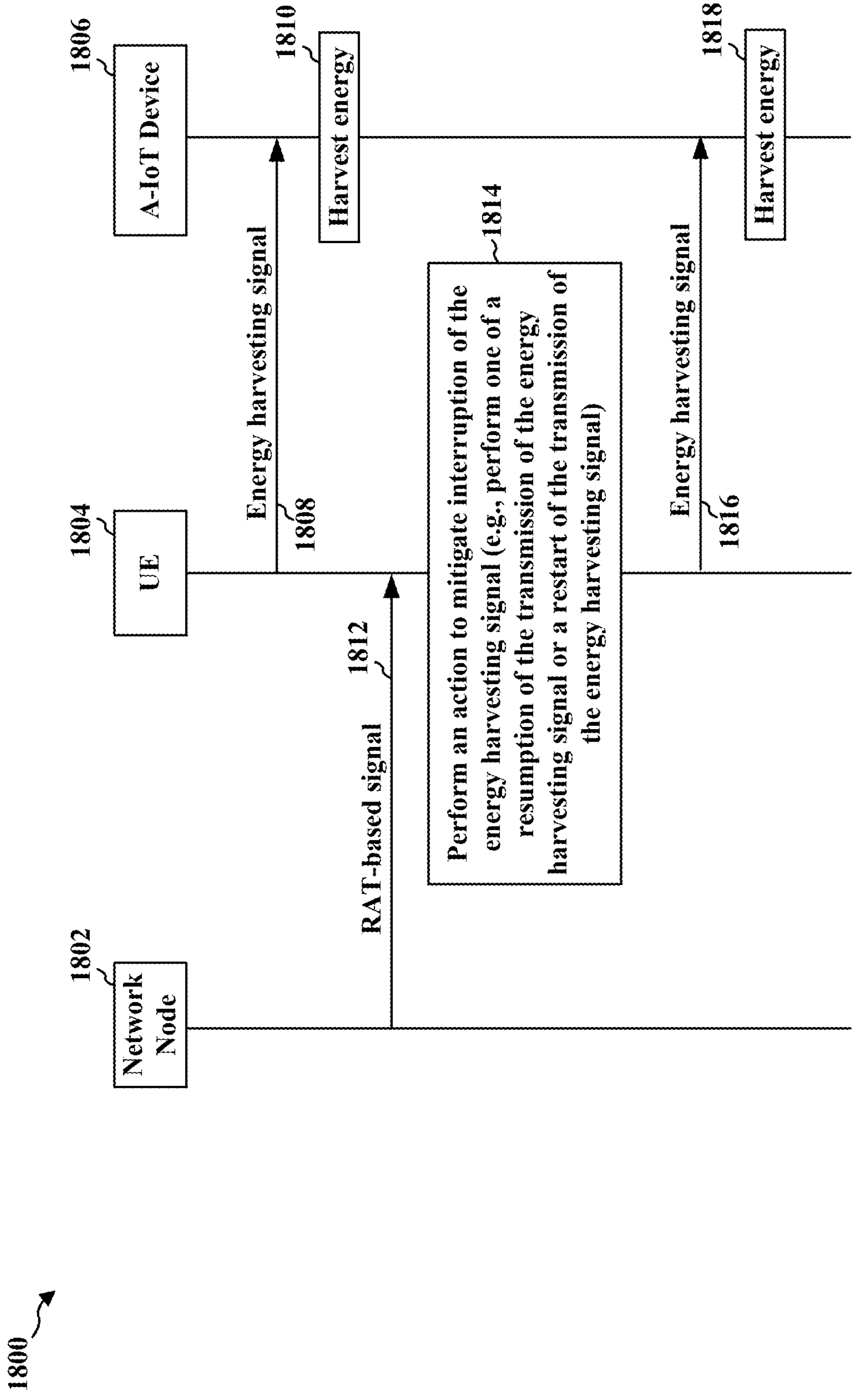
FIG. 18 is a call flow diagram illustrating a method of wireless communication in accordance with various aspects of this present disclosure.

FIG. 18 depicts a call flow diagram 1800 illustrating a method of wireless communication in accordance with various aspects of this present disclosure. In particular, diagram 1800 illustrates a method for mitigating an interruption of an energy harvesting signal by a downlink signal. As shown in FIG. 18, the diagram 1800 includes a network node 1802, a UE 1804, and an ambient IoT device 1806. The network node 1802 may be an example of the base station 102, the base station 310, the network node 502, the network node 702A, the network node 702B, the network node 702C, the network node 802A, the network node 802B, the network node 902, the network node 1002, the network node 1102, or the network node 1702. The UE 1804 may be an example of the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, or the UE 1704. The ambient IoT device 1706 may be an example of the ambient IoT tag device 506, the ambient IoT tag device 706A, the ambient IoT tag device 706B, the ambient IoT tag device 706C, the ambient IoT tag device 806A, the ambient IoT tag device 806B, the ambient IoT tag device 906, the ambient IoT tag device 1006, the ambient IoT tag device 1106, the ambient IoT tag device 1406, or the ambient IoT device 1706. Although aspects are described for the network node 1802, the aspects may be performed by the network node 1802 in aggregation and/or by one or more components of the network node 1802 (e.g., such as a CU 110, a DU 130, and/or an RU 140). As shown in FIG. 18, at 1808, the UE 1804 may transmit, for a first duration, a first portion of an energy harvesting signal to the ambient IoT device 1806. The first duration may be less than a total duration for energy harvesting to complete at the ambient IoT device 1806.

At 1810, the ambient IoT device 1806 may harvest energy based on the first portion of the energy harvesting signal received at 1808.

At 1812, the UE 1804 may receive a RAT-based signal (e.g., a downlink signal) from the network node 1802. The RAT-based signal may interrupt transmission of the energy harvesting signal.

At 1814, the UE 1804 may perform an action to mitigate interruption of the energy harvesting signal. For example, the UE 1804 may perform, for a second duration in response to receiving the RAT-based signal at 1812, one of a resumption of the transmission of the energy harvesting signal or a restart of the transmission of the energy harvesting signal, where the resumption and the restart include a second portion of the energy harvesting signal.

At 1816, the UE 1804 may restart or resume the energy harvesting signal.

At 1818, the ambient IoT device 1806 may harvest energy based on the restarted or resumed energy harvesting signal received at 1816.

In an aspect in which the energy harvesting signal is restarted and transmitted at 1818, the second duration may be equal to the total duration.

In an aspect in which the energy harvesting signal is resumed and transmitted at 1818, the second duration may correspond to a difference between the total duration and the first duration, and where the second portion is different than the first portion.

In an aspect in which the energy harvesting signal is resumed and transmitted at 1818, the second duration is less than a difference between the total duration and the first duration, and where the second portion is different than the first portion.

Figure 19:
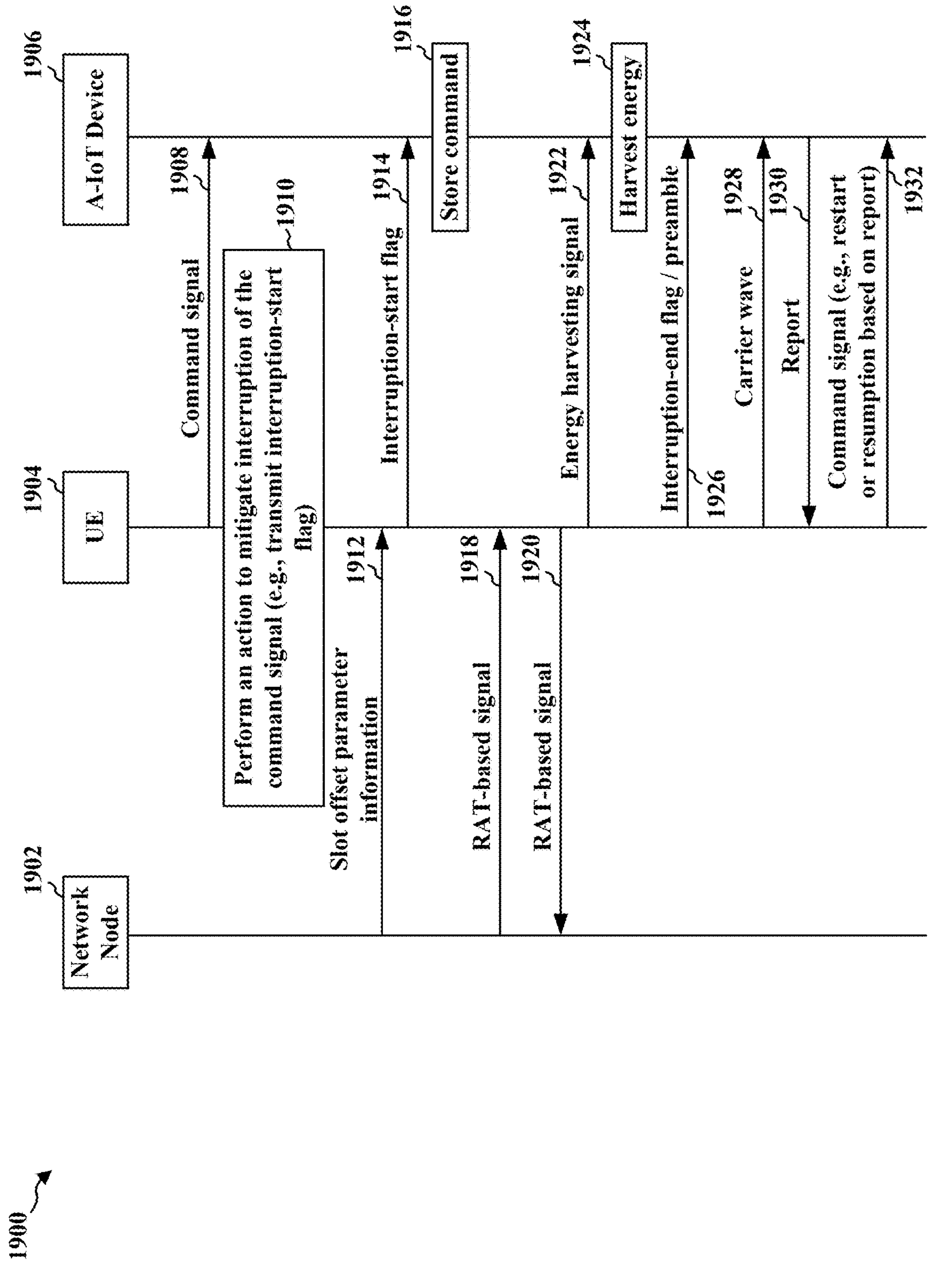
FIG. 19 is a call flow diagram illustrating a method of wireless communication in accordance with various aspects of this present disclosure.

FIG. 19 depicts a call flow diagram 1900 illustrating a method of wireless communication in accordance with various aspects of this present disclosure. In particular, diagram 1900 illustrates a method for mitigating an interruption of a command signal by an uplink signal or a downlink signal. As shown in FIG. 19, the diagram 1900 includes a network node 1902, a UE 1904, and an ambient IoT device 1906. The network node 1902 may be an example of the base station 102, the base station 310, the network node 502, the network node 702A, the network node 702B, the network node 702C, the network node 802A, the network node 802B, the network node 902, the network node 1002, the network node 1102, the network node 1702, or the network node 1802. The UE 1904 may be an example of the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, the UE 1704, or the UE 1804. The ambient IoT device 1906 may be an example of the ambient IoT tag device 506, the ambient IoT tag device 706A, the ambient IoT tag device 706B, the ambient IoT tag device 706C, the ambient IoT tag device 806A, the ambient IoT tag device 806B, the ambient IoT tag device 906, the ambient IoT tag device 1006, the ambient IoT tag device 1106, the ambient IoT tag device 1406, the ambient IoT device 1706, or the ambient IoT device 1806. Although aspects are described for the network node 1902, the aspects may be performed by the network node 1902 in aggregation and/or by one or more components of the network node 1902 (e.g., such as a CU 110, a DU 130, and/or an RU 140). As shown in FIG. 19, at 1908, the UE 1904 may transmit at least a portion of command signal to the ambient IoT device 1906.

At 1910, the UE 1904 may determine that it is to perform at least one of a transmission of a RAT-based signal (e.g., an uplink signal) to the network node 1902 or a reception of a RAT-based signal (e.g., a downlink signal) from the network node 1902. The uplink RAT-based signal and/or the downlink RAT-based signal may be configured to interrupt transmission of the command signal. The UE 1904 may perform an action to mitigate interruption of the command signal, which, as described below, may include the transmission of an interruption-start flag to the ambient IoT device 1906.

In some aspects, at 1912, the network node 1902 may provide slot offset parameter information to the UE 1904, which may enable the UE 1904 to reserve enough time to indicate the interruption-start flag. The slot offset parameter information may specify an increased value for a first parameter (e.g., the $k_0$ parameter) that defines a first offset between a slot (Slot 1) in which a PDCCH is received and a slot (Slot 3) in which a PDSCH is received. The information may also specify an increased value for a second parameter (e.g., the $k_2$ parameter) that defines a second offset between a slot (Slot 4) in which the PDCCH is received and a slot (Slot 9) in which uplink data is to be transmitted on a PUSCH.

At 1914, the UE 1904 may transmit the interruption-start flag to the ambient IoT device 1906. The interruption-start flag may be an indication of an interruption of the transmission of the command signal. The interruption-start flag may be transmitted based on the slot offset parameter information received at 1914.

In some aspects, the interruption-start flag may indicate a duration for which the transmission of the command signal has been (or will be) interrupted.

In some aspects, at 1916, the ambient IoT device 1906 may store the portion of the command signal received at 1908 based on receiving the interruption-start flag at 1914.

At 1918, the UE 1904 may receive the downlink RAT-based signal from the network node 1902.

At 1920, the UE 1904 may transmit the uplink RAT-based signal to the network node 1902.

In some aspects, at 1922, the UE 1904 may transmit an energy harvesting signal to the ambient IoT device 1906, which may enable the ambient IoT device 1906 to harvest energy in the case where power at the ambient IoT device 1906 drops during the interruption. At 1924, the ambient IoT device 1906 may harvest energy based on the energy harvesting signal received at 1922.

In some aspects, at 1926, the UE 1904 may transmit, to the ambient IoT device 1906, at least one of an interruption-end flag or a preamble of the command signal after completion of the interruption. The interruption-end flag and/or the preamble may indicate that the interruption is complete.

In some aspects, at 1928, the UE 1904 may transmit a carrier wave signal to the ambient IoT device 1906. At 1930, the ambient IoT device 1906 may transmit a report based on the carrier wave signal. The report may indicate whether a portion of the command signal is stored at the ambient IoT device (e.g., at 1916).

At 1932, the UE 1904 may either resume the transmission of the command signal (e.g., based on the report indicating that a portion of the command signal is stored at the ambient IoT device 1906) or restart the transmission of the command signal (e.g., based on the report indication that a portion of the command signal is not stored at the ambient IoT device 1906). The transmission of the command signal may be resumed by transmitting a remaining portion of the command signal (e.g., transmitting the energy harvesting signal at 1922, after transmitting the interruption-end flag and/or the preamble of the command signal at 1926, and/or after receiving the report at 1930).

Figure 20:
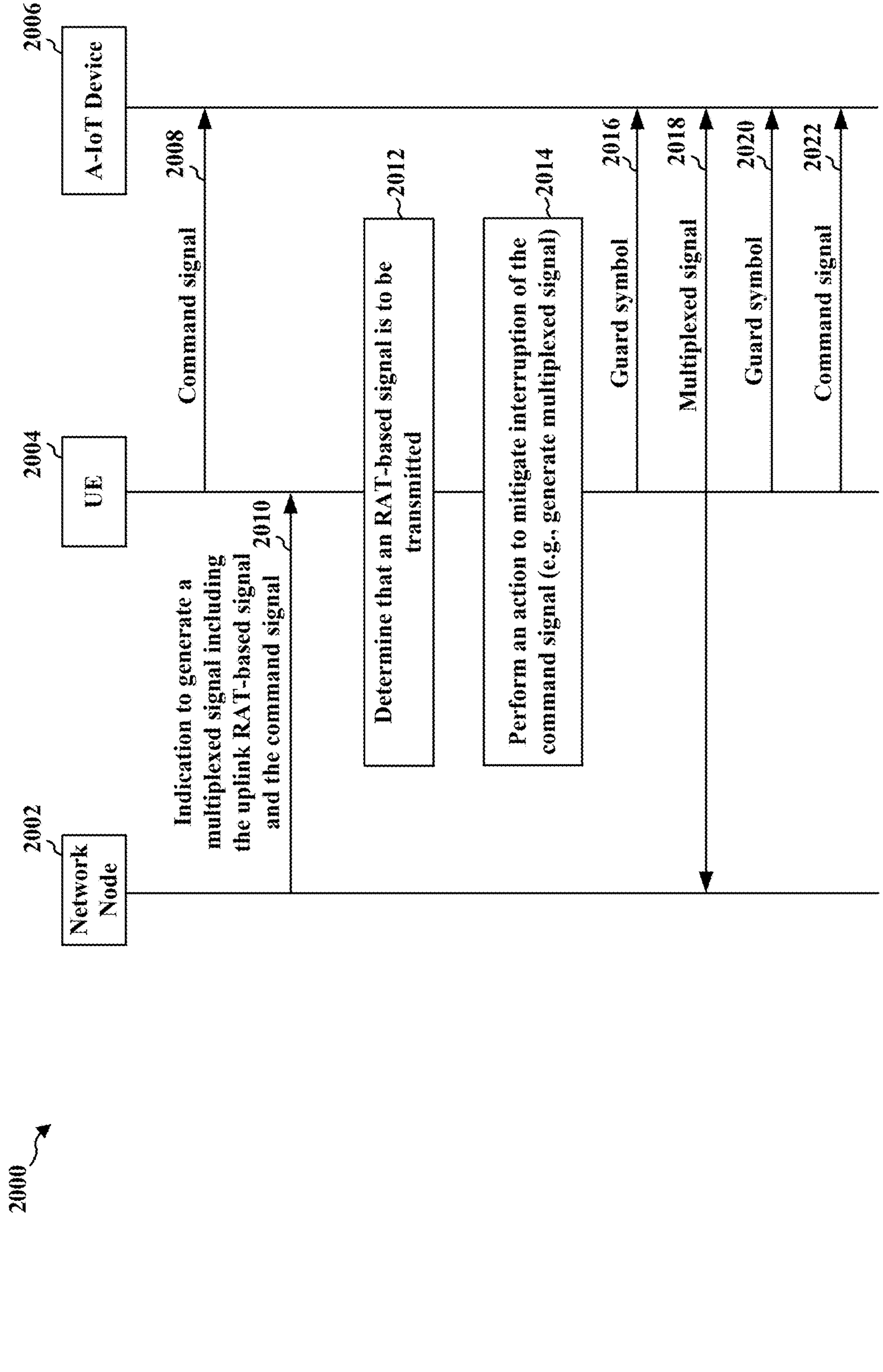
FIG. 20 is a call flow diagram illustrating a method of wireless communication in accordance with various aspects of this present disclosure.

FIG. 20 depicts a call flow diagram 2000 illustrating a method of wireless communication in accordance with various aspects of this present disclosure. In particular, diagram 2000 illustrates a method for mitigating an interruption of a command signal by an uplink signal using a multiplexed signal. As shown in FIG. 20, the diagram 2000 includes a network node 2002, a UE 2004, and an ambient IoT device 2006. The network node 2002 may be an example of the base station 102, the base station 310, the network node 502, the network node 702A, the network node 702B, the network node 702C, the network node 802A, the network node 802B, the network node 902, the network node 1002, the network node 1102, the network node 1702, the network node 1802, or the network node 1902. The UE 1904 may be an example of the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, the UE 1704, the UE 1804, or the UE 1904. The ambient IoT device 1906 may be an example of the ambient IoT tag device 506, the ambient IoT tag device 706A, the ambient IoT tag device 706B, the ambient IoT tag device 706C, the ambient IoT tag device 806A, the ambient IoT tag device 806B, the ambient IoT tag device 906, the ambient IoT tag device 1006, the ambient IoT tag device 1106, the ambient IoT tag device 1406, the ambient IoT device 1706, the ambient IoT device 1806, or the ambient IoT device 1906. Although aspects are described for the network node 2002, the aspects may be performed by the network node 2002 in aggregation and/or by one or more components of the network node 2002 (e.g., such as a CU 110, a DU 130, and/or an RU 140). As shown in FIG. 20, at 2008, the UE 2004 may transmit at least a portion of command signal to the ambient IoT device 2006.

At 2010, the UE 2004 may receive an indication, from the network node 2002, to generate a multiplexed signal including the uplink RAT-based signal and the command signal.

At 2012, the UE 2004 may determine that a RAT-based signal (e.g., an uplink signal) is to be transmitted by the UE 2004. For example, the UE 2004 may obtain an indication in response to a determination that a resource for uplink transmission is available, in response to a determination that data has been buffered for transmission, etc.).

At 2014, the UE 2004 may perform an action to mitigate interruption of the command signal, for example, by generating a multiplexed signal based on the command signal and the uplink RAT-based signal.

At 2016, the UE 2004 may provide a first guard symbol to the ambient IoT device 2006.

At 2018, the UE 2004 may transmit the multiplexed signal to the network node 2002 and the ambient IoT device 2006. The network node 2002 may obtain the uplink RAT-based signal based on the multiplexed signal, for example, by performing a demultiplexing operation. The ambient IoT device 2006 may obtain the command signal based on the multiplexed signal, for example, by performing a demultiplexing operation.

At 2020, the UE 2004 may provide a second guard symbol to the ambient IoT device 2006. The first and second guard symbols may be transmitted to enable the ambient IoT device 2006 to adapt between the waveform of the command signal received at 2008 and the waveform of the multiplexed signal received at 2018.

At 2022, after transmission of the multiplexed signal is complete, the UE 2004 may revert to transmitting a command signal without multiplexing the command signal with an uplink RAT-based signal.

Figure 21:
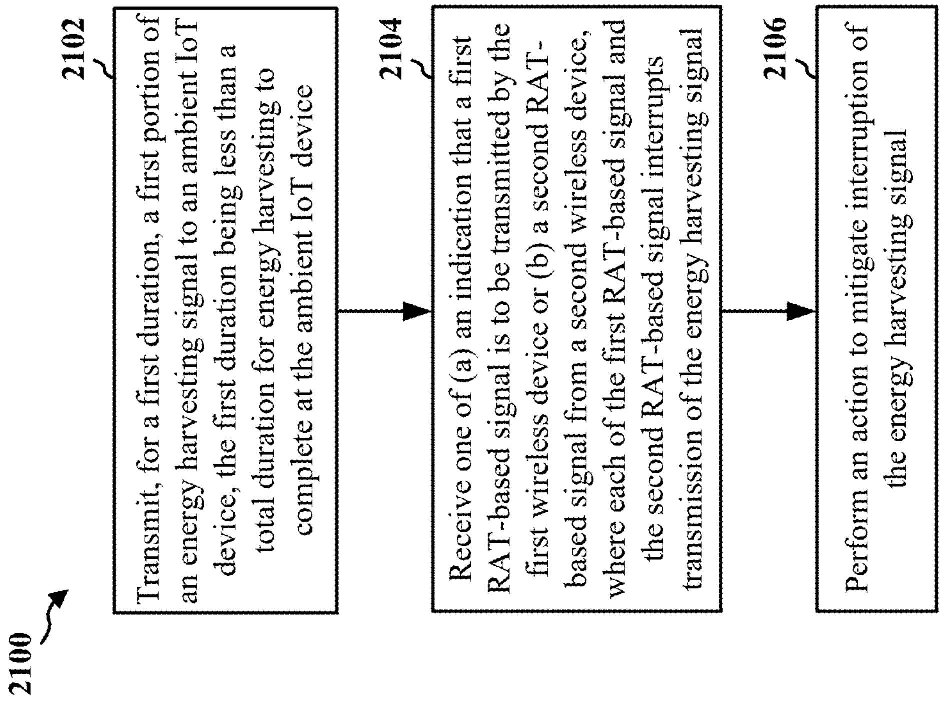
FIG. 21 is a flowchart illustrating methods of wireless communication in accordance with various aspects of the present disclosure.

FIG. 21 is a flowchart 2100 illustrating methods of wireless communication at a first wireless device in accordance with various aspects of the present disclosure. In some aspects, the first wireless device may be the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, the UE 1704, the UE 1804, the UE 1904, or the UE 2004, or the apparatus 2504 in the hardware implementation of FIG. 25. In other aspects, the first wireless device may be the base station 102, the base station 310, the network node 502, the network node 702A, the network node 702B, the network node 702C, the network node 802A, the network node 802B, the network node 902, the network node 1002, the network node 1102, the network node 1702, the network node 1802, the network node 1902, or the network node 2002, or the network entity 2602 in the hardware implementation of FIG. 26.

At 2102, the first wireless device may transmit, for a first duration, a first portion of an energy harvesting signal to an ambient IoT device, the first duration being less than a total duration for energy harvesting to complete at the ambient IoT device. For example, referring to FIG. 17, the UE 1704, at 1708, may transmit, for a first duration, a first portion of an energy harvesting signal to the ambient IoT device 1706, the first duration being less than a total duration for energy harvesting to complete at the ambient IoT device 1706. In an aspect, 2102 may be performed by the A-IoT forward link interruption mitigation component 198 or the A-IoT forward link interruption mitigation component 199.

At 2104, the first wireless device may receive one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal. For example, referring to FIG. 17, the UE 1704, at 1712, may receive an indication that an uplink RAT-based signal is to be transmitted by the UE 1704 (e.g., the UE 1704 may obtain an indication in response to a determination that a resource for uplink transmission is available, in response to a determination that data has been buffered for transmission, etc.). The uplink RAT-based signal may interrupt transmission of the energy harvesting signal. In another example, referring to FIG. 18, the UE 1804, at 1812, may receive a downlink RAT-based signal from the network node 1802. The downlink RAT-based signal may interrupt transmission of the energy harvesting signal. In an aspect, 2104 may be performed by the A-IoT forward link interruption mitigation component 198 or the A-IoT forward link interruption mitigation component 199.

At 2106, the first wireless device may perform an action to mitigate interruption of the energy harvesting signal. For example, referring to FIG. 17, at 1714, the UE 1704 may perform an action to mitigate interruption of the energy harvesting signal. In another example, referring to FIG. 18, at 1814, the UE 1804 may perform an action to mitigate interruption of the energy harvesting signal. In an aspect, 2106 may be performed by the A-IoT forward link interruption mitigation component 198 or the A-IoT forward link interruption mitigation component 199.

In some aspects, the first wireless device may perform the action to mitigate the interruption of the energy harvesting signal by, in response to receiving the indication that the first RAT-based signal is to be transmitted by the first wireless device, pausing transmission of the energy harvesting signal, and transmitting, for the second wireless device and the ambient IoT device, the first RAT-based signal, where the first RAT-based signal is configured to enable energy harvesting at the ambient IoT device. For example, referring to FIG. 17, the UE 1704 may, at 1714, in response to receiving the indication at 1712 that an uplink RAT-based signal is to be transmitted by the UE 1704, pause transmission of the energy harvesting signal. At 1726, the UE 1704 may transmit, for the network node 1702 and the ambient IoT device 1706, the uplink RAT-based signal, where the uplink RAT-based signal is configured to enable energy harvesting at the ambient IoT device 1706.

In some aspects, the first wireless device may transmit the first RAT-based signal by receiving an indication of resources allocated by the second wireless device for transmission of the first RAT-based signal, and transmitting the first RAT-based signal based on the resources allocated by the second wireless device. For example, referring to FIG. 17, the UE 1704, at 1720, may receive an indication of resources allocated by the network node 1702 for transmission of the uplink RAT-based signal. At 1726, the UE 1704 may transmit the uplink RAT-based signal based on the resources allocated by the network node 1702.

In some aspects, the first wireless device may transmit, for the second wireless device, a request for the resources. For example, referring to FIG. 17, the UE 1704, at 1716, may transmit a request for the resources to the network node 1702.

In some aspects, the first wireless device may transmit the first RAT-based signal by increasing a power level for transmitting the first RAT-based signal and transmitting the first RAT-based signal based on the increased power level. For example, referring to FIG. 17, the UE 1704, at 1722 may increase a power level for transmitting the uplink RAT-based signal. At 1726, the UE 1704 may transmit the uplink RAT-based signal based on the increased power level.

In some aspects, the first wireless device may transmit, for the second wireless device, an indication of the increased power level. For example, referring to FIG. 17, the UE 1704, at 1724, may transmit, to the network node 1702, an indication of the increased power level.

In some aspects, the first wireless device may perform the action to mitigate the interruption of the energy harvesting signal by performing, for a second duration in response to receiving the second RAT-based signal from the second wireless device, one of a resumption of the transmission of the energy harvesting signal or a restart of the transmission of the energy harvesting signal, where the resumption and the restart include a second portion of the energy harvesting signal. For example, referring to FIG. 18, the UE 1804 may, at 1814, perform, for a second duration in response to receiving a downlink RAT-based signal from the network node 1802 at 1812, one of a resumption of the transmission of the energy harvesting signal or a restart of the transmission of the energy harvesting signal, where the resumption and the restart include a second portion of the energy harvesting signal.

In some aspects, the second duration may be equal to the total duration. For example, referring to FIG. 18, in an aspect in which the UE 1804 restarts and transmits the energy harvesting at 1818, the second duration may be equal to the total duration.

In some aspects, the second duration may correspond to a difference between the total duration and the first duration, where the second portion is different than the first portion. For example, referring to FIG. 18, in an aspect in which the UE 1804 resumes and transmits the energy harvesting signal at 1818, the second duration may correspond to a difference between the total duration and the first duration, and where the second portion is different than the first portion.

In some aspects, the second duration is less than a difference between the total duration and the first duration, and where the second portion is different than the first portion. For example, referring to FIG. 18, in an aspect in which the UE 1804 resumes and transmits the energy harvesting signal at 1818, the second duration is less than a difference between the total duration and the first duration, and where the second portion is different than the first portion.

Figure 22:
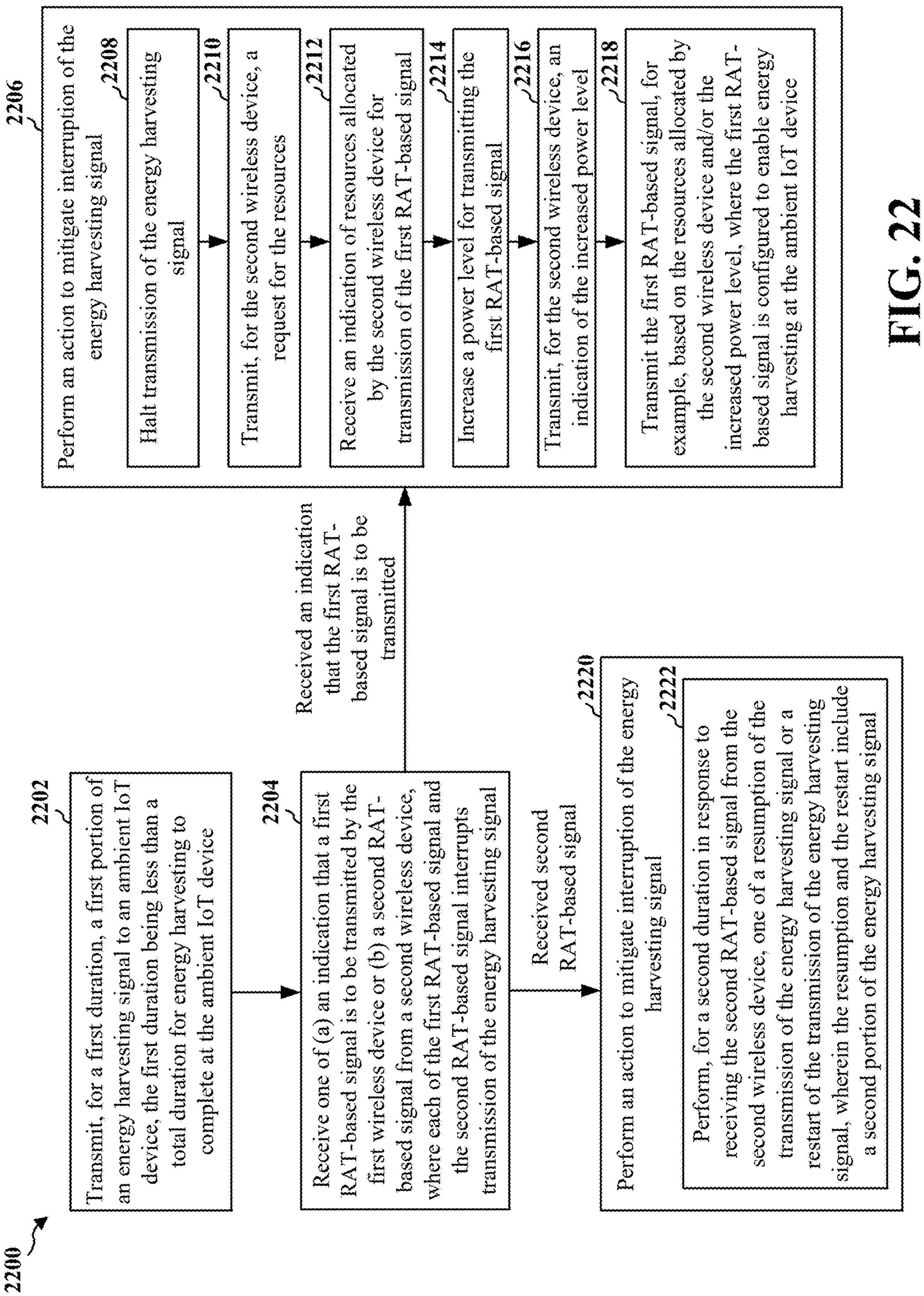
FIG. 22 is a flowchart illustrating methods of wireless communication in accordance with various aspects of the present disclosure.

FIG. 22 is a flowchart 2200 illustrating methods of wireless communication at a first wireless device in accordance with various aspects of the present disclosure. In some aspects, the first wireless device may be the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, the UE 1704, the UE 1804, the UE 1904, or the UE 2004, or the apparatus 2504 in the hardware implementation of FIG. 25. In other aspects, the first wireless device may be the base station 102, the base station 310, the network node 502, the network node 702A, the network node 702B, the network node 702C, the network node 802A, the network node 802B, the network node 902, the network node 1002, the network node 1102, the network node 1702, the network node 1802, the network node 1902, or the network node 2002, or the network entity 2602 in the hardware implementation of FIG. 26.

At 2202, the first wireless device may transmit, for a first duration, a first portion of an energy harvesting signal to an ambient IoT device, the first duration being less than a total duration for energy harvesting to complete at the ambient IoT device. For example, referring to FIG. 17, the UE 1704, at 1708, may transmit, for a first duration, a first portion of an energy harvesting signal to the ambient IoT device 1706, the first duration being less than a total duration for energy harvesting to complete at the ambient IoT device 1706. In an aspect, 2202 may be performed by the A-IoT forward link interruption mitigation component 198 or the A-IoT forward link interruption mitigation component 199.

At 2204, the first wireless device may receive one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal. For example, referring to FIG. 17, the UE 1704, at 1712, may receive an indication that an uplink RAT-based signal is to be transmitted by the UE 1704. The UE 1704 may obtain an indication in response to a determination that a resource for uplink transmission is available, in response to a determination that data has been buffered for transmission, etc.). The uplink RAT-based signal may interrupt transmission of the energy harvesting signal. Referring to FIG. 18, the UE 1804, at 1812, may receive a downlink RAT-based signal from the network node 1802. The uplink RAT-based signal may interrupt transmission of the energy harvesting signal. If the indication that an uplink RAT-based signal is to be transmitted is received by the UE 1704, flow continues to 2206. If a second RAT-based signal from a second wireless device is received, flow continues to 2220. In an aspect, 2204 may be performed by the A-IoT forward link interruption mitigation component 198 or the A-IoT forward link interruption mitigation component 199.

At 2206, the first wireless device may perform an action to mitigate interruption of the energy harvesting signal. For example, referring to FIG. 17, at 1714, the UE 1704 may perform an action to mitigate interruption of the energy harvesting signal. In an aspect, 2206 may be performed by the A-IoT forward link interruption mitigation component 198 or the A-IoT forward link interruption mitigation component 199.

In some aspects, as part of 2206, at 2208, the first wireless device may perform the action to mitigate the interruption of the energy harvesting signal by, in response to receiving the indication that the first RAT-based signal is to be transmitted by the first wireless device, pausing transmission of the energy harvesting signal, where the first RAT-based signal is configured to enable energy harvesting at the ambient IoT device. For example, referring to FIG. 17, the UE 1704 may, at 1714, in response to receiving the indication at 1712 that an uplink RAT-based signal is to be transmitted by the UE 1704, pause transmission of the energy harvesting signal, where the uplink RAT-based signal is configured to enable energy harvesting at the ambient IoT device 1706. In an aspect, 2208 may be performed by the A-IoT forward link interruption mitigation component 198 or the A-IoT forward link interruption mitigation component 199.

In some aspects, as part of 2206, at 2210, the first wireless device may transmit, for the second wireless device, a request for the resources. For example, referring to FIG. 17, the UE 1704, at 1716, may transmit a request for the resources to the network node 1702. In an aspect, 2210 may be performed by the A-IoT forward link interruption mitigation component 198 or the A-IoT forward link interruption mitigation component 199.

In some aspects, as part of 2206, at 2212, the first wireless device may an indication of resources allocated by the second wireless device for transmission of the first RAT-based signal. For example, referring to FIG. 17, the UE 1704, at 1720, may receive an indication of resources allocated by the network node 1702 for transmission of the uplink RAT-based signal. In an aspect, 2212 may be performed by the A-IoT forward link interruption mitigation component 198 or the A-IoT forward link interruption mitigation component 199.

In some aspects, as part of 2206, at 2214, the first wireless device may increase a power level for transmitting the first RAT-based signal and transmitting the first RAT-based signal based on the increased power level. For example, referring to FIG. 17, the UE 1704, at 1722 may increase a power level for transmitting the uplink RAT-based signal. In an aspect, 2214 may be performed by the A-IT forward link interruption mitigation component 198 or the A-IoT forward link interruption mitigation component 199.

In some aspects, as part of 2206, at 2216, the first wireless device may transmit, for the second wireless device, an indication of the increased power level. For example, referring to FIG. 17, the UE 1704, at 1724, may transmit, to the network node 1702, an indication of the increased power level. In an aspect, 2216 may be performed by the A-IoT forward link interruption mitigation component 198 or the A-IoT forward link interruption mitigation component 199.

In some aspects, as part of 2206, at 2218, the first wireless device may transmit the first RAT-based signal, for example, based on the resources allocated by the second wireless device and/or the increased power level, where the first RAT-based signal may be configured to enable energy harvesting at the ambient IoT device. For example, referring to FIG. 17, at 1726, the UE 1704 may transmit the uplink RAT-based signal, for example, based on the resource allocated by the network node 1702 and/or the increased power level. The first RAT-based signal may be configured to enable energy harvesting at the ambient IoT device 1706. In an aspect, 2218 may be performed by the A-IoT forward link interruption mitigation component 198 or the A-IoT forward link interruption mitigation component 199.

At 2220, the first wireless device may perform an action to mitigate interruption of the energy harvesting signal. For example, referring to FIG. 18, at 1814, the UE 1804 may perform an action to mitigate interruption of the energy harvesting signal. In an aspect, 2220 may be performed by the A-IoT forward link interruption mitigation component 198 or the A-IoT forward link interruption mitigation component 199.

In some aspects, as part of 2220, at 2222, the first wireless device may perform the action to mitigate the interruption of the energy harvesting signal by performing, for a second duration in response to receiving the second RAT-based signal from the second wireless device, one of a resumption of the transmission of the energy harvesting signal or a restart of the transmission of the energy harvesting signal, where the resumption and the restart include a second portion of the energy harvesting signal. For example, referring to FIG. 18, the UE 1804 may, at 1814, perform, for a second duration in response to receiving a downlink RAT-based signal from the network node 1802 at 1812, one of a resumption of the transmission of the energy harvesting signal or a restart of the transmission of the energy harvesting signal, where the resumption and the restart include a second portion of the energy harvesting signal. In an aspect, 2222 may be performed by the A-IoT forward link interruption mitigation component 198 or the A-IoT forward link interruption mitigation component 199.

In some aspects, the second duration may be equal to the total duration. For example, referring to FIG. 18, in an aspect in which the UE 1804 restarts and transmits the energy harvesting at 1818, the second duration may be equal to the total duration.

In some aspects, the second duration may correspond to a difference between the total duration and the first duration, where the second portion is different than the first portion. For example, referring to FIG. 18, in an aspect in which the UE 1804 resumes and transmits the energy harvesting signal at 1818, the second duration may correspond to a difference between the total duration and the first duration, and where the second portion is different than the first portion.

In some aspects, the second duration is less than a difference between the total duration and the first duration, and where the second portion is different than the first portion. For example, referring to FIG. 18, in an aspect in which the UE 1804 resumes and transmits the energy harvesting signal at 1818, the second duration is less than a difference between the total duration and the first duration, and where the second portion is different than the first portion.

Figure 23:
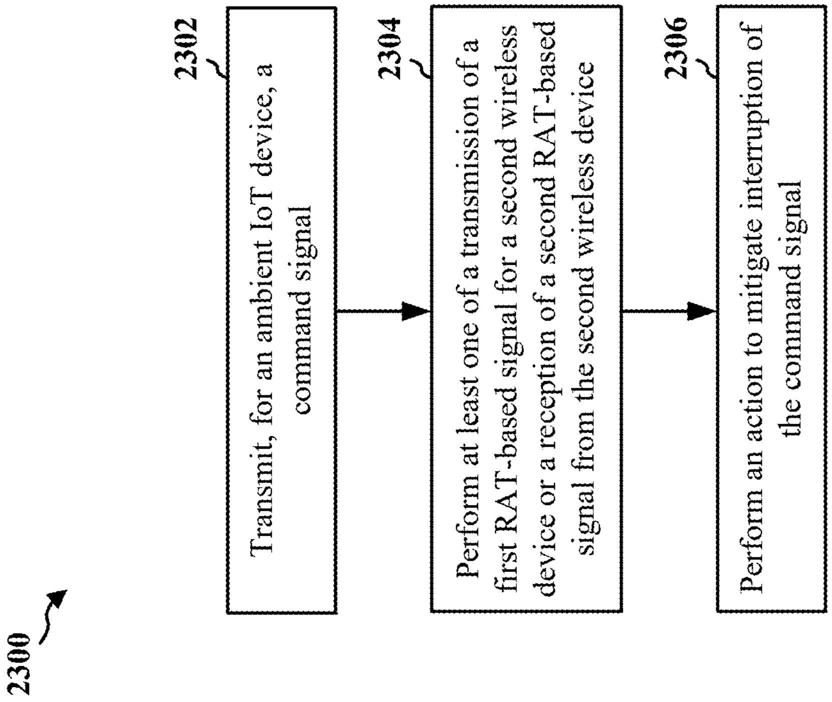
FIG. 23 is a flowchart illustrating methods of wireless communication in accordance with various aspects of the present disclosure.

FIG. 23 is a flowchart 2300 illustrating methods of wireless communication at a first wireless device in accordance with various aspects of the present disclosure. In some aspects, the first wireless device may be the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, the UE 1704, the UE 1804, the UE 1904, or the UE 2004, or the apparatus 2504 in the hardware implementation of FIG. 25. In other aspects, the first wireless device may be the base station 102, the base station 310, the network node 502, the network node 702A, the network node 702B, the network node 702C, the network node 802A, the network node 802B, the network node 902, the network node 1002, the network node 1102, the network node 1702, the network node 1802, the network node 1902, or the network node 2002, or the network entity 2602 in the hardware implementation of FIG. 26.

At 2302, the first wireless device may transmit, for an ambient IoT device, a command signal. For example, referring to FIG. 19, the UE 1904 may, at 1908, transmit a command signal to the ambient IoT device 1906. In another example, referring to FIG. 20, the UE 2004 may, at 2008, transmit a command signal to the ambient IoT device 2006. In an aspect, 2302 may be performed by the A-IoT forward link interruption mitigation component 198 or the A-IoT forward link interruption mitigation component 199.

At 2304, the first wireless device may perform at least one of a transmission of a first RAT-based signal for a second wireless device or a reception of a second RAT-based signal from the second wireless device. For example, referring to FIG. 19, the UE 1904 may perform at least one of a transmission of a first RAT-based signal for the network node 1902 at 1920 or a reception of a second RAT-based signal from the network node 1902 at 1918. In an aspect, 2304 may be performed by the A-IoT forward link interruption mitigation component 198 or the A-IoT forward link interruption mitigation component 199.

At 2306, the first wireless device may perform an action to mitigate interruption of the command signal. For example, referring to FIG. 19, the UE 1904 may, at 1910, perform an action to mitigate interruption of the command signal. In an aspect, 2306 may be performed by the A-IoT forward link interruption mitigation component 198 or the A-IoT forward link interruption mitigation component 199.

In some aspects, each of the first RAT-based signal and the second RAT-based signal interrupts transmission of the command signal. For example, referring to FIG. 19, the first RAT-based signal that may be transmitted by the UE 1904 at 1920 and the second RAT-based signal that may be received by the UE 1904 at 1918 may interrupt transmission of the command signal transmitted at 1908.

In some aspects, the first wireless device may perform the action to mitigate the interruption of the command signal by transmitting, for the ambient IoT device, a first indication of an interruption of the transmission of the command signal. For example, referring to FIG. 19, the UE 1904 may, at 1914, transmit, for the ambient IoT device 1906, a first indication of an interruption of the transmission of the command signal (e.g., the interruption-start flag).

In some aspects, the first indication may indicate a duration for which the transmission of the command signal has been interrupted. For example, referring to FIG. 19, the first indication transmitted by the UE 1904 at 1914 may indicate a duration for which the transmission of the command signal has been interrupted.

In some aspects, the first wireless device may receive information that specifies at least one of (i) an increased value for a first parameter that defines a first offset between a first slot in which a PDCCH is received and a second slot in which a PDSCH is received or (ii) an increased value for a second parameter that defines a second offset between a third slot in which the PDCCH is received and a fourth slot in which uplink data is to be transmitted on a PUSCH. For example, referring to FIG. 19, the UE 1904 may, at 1912, receive information that specifies at least one of (i) an increased value for a first parameter that defines a first offset between a first slot in which a PDCCH is received and a second slot in which a PDSCH is received or (ii) an increased value for a second parameter that defines a second offset between a third slot in which the PDCCH is received and a fourth slot in which uplink data is to be transmitted on a PUSCH. The UE 1904 may transmit the first indication at 1914 based on the first parameter and the second parameter.

In some aspects, the first wireless device may perform the action to mitigate the interruption of the command signal by transmitting, for the ambient IoT device, a second indication that the interruption is complete, and resuming the transmission of the command signal for the ambient IoT device. For example, referring to FIG. 19, the UE 1904 may, at 1926, transmit, for the ambient IoT device 1906, a second indication that the interruption is complete (e.g., the interruption-end flag), and, at 1932, resume the transmission of the command signal for the ambient IoT device 1906.

In some aspects, the first wireless device may perform the action to mitigate the interruption of the command signal by transmitting, for the ambient IoT device, a preamble of the command signal after completion of the interruption, and resuming the transmission of the command signal for the ambient IoT device. For example, referring to FIG. 19, the UE 1904 may, at 1926, transmit, for the ambient IoT device 1906, a preamble of the command signal after completion of the interruption, and, at 1932, resume the transmission of the command signal for the ambient IoT device 1906.

In some aspects, the first wireless device may perform the action to mitigate the interruption of the command signal by transmitting, for the ambient IoT device, an energy harvesting signal, transmitting, for the ambient IoT device after the transmission of the energy harvesting signal, a second indication that the interruption is complete, and resuming the transmission of the command signal for the ambient IoT device. For example, referring to FIG. 19, the UE 1904 may, at 1922, transmit, for the ambient IoT device 1906, an energy harvesting signal. At 1926, the UE 1904 may transmit, for the ambient IoT device 1906 after the transmission of the energy harvesting signal, a second indication (e.g., the interruption-end flag and/or the preamble) that the interruption is complete. At 1932, the UE 1904 may resume the transmission of the command signal for the ambient IoT device 1906.

In some aspects, the first wireless device may perform the action to mitigate the interruption of the command signal by transmitting, for the ambient IoT device, a carrier wave signal, receiving a report from the ambient IoT device based on the carrier wave signal, where the report indicates whether a portion of the command signal is stored at the ambient IoT device, transmitting, for the ambient IoT device in response to determining that the portion of the command signal is stored at the ambient IoT device, a remaining portion of the command signal, and restarting the transmission, in response to determining that the portion of the command signal is not stored at the ambient IoT device, of the command signal for the ambient IoT device. For example, referring to FIG. 19, the UE 1904 may, at 1928, transmit, for the ambient IoT device 1906, a carrier wave signal. The UE 1904 may, at 1930, receive a report from the ambient IoT device 1906 based on the carrier wave signal, where the report indicates whether a portion of the command signal is stored at the ambient IoT device 1906. The UE 1904, at 1932, may transmit, for the ambient IoT device 1906, in response to determining that the portion of the command signal is stored at the ambient IoT device 1906, a remaining portion of the command signal. The UE 1904, at 1932, may restart the transmission, in response to determining that the portion of the command signal is not stored at the ambient IoT device 1906, of the command signal for the ambient IoT device 1906.

In some aspects, the first wireless device may receive, from the second wireless device, an indication to generate a multiplexed signal including the first RAT-based signal for the second wireless device and the command signal for the ambient IoT device. The first wireless device may perform the transmission of the first RAT-based signal and the action to mitigate the interruption of the command signal by transmitting the multiplexed signal. For example, referring to FIG. 20, the UE 2004 may, at 2010, receive, from the network node 2002, an indication to generate a multiplexed signal including the first RAT-based signal for the network node 2002 and the command signal for the ambient IoT device 2006. The UE 2004 may perform the transmission of the first RAT-based signal and the action to mitigate the interruption of the command signal by transmitting, at 2018, the multiplexed signal.

In some aspects, the first wireless device may transmit at least one of a first guard symbol before the multiplexed signal or a second guard symbol after the multiplexed signal. For example, referring to FIG. 20, the UE 2004 may transmit at least one of a first guard symbol before the multiplexed signal (at 2016) or a second guard symbol after the multiplexed signal (at 2020).

Figure 24:
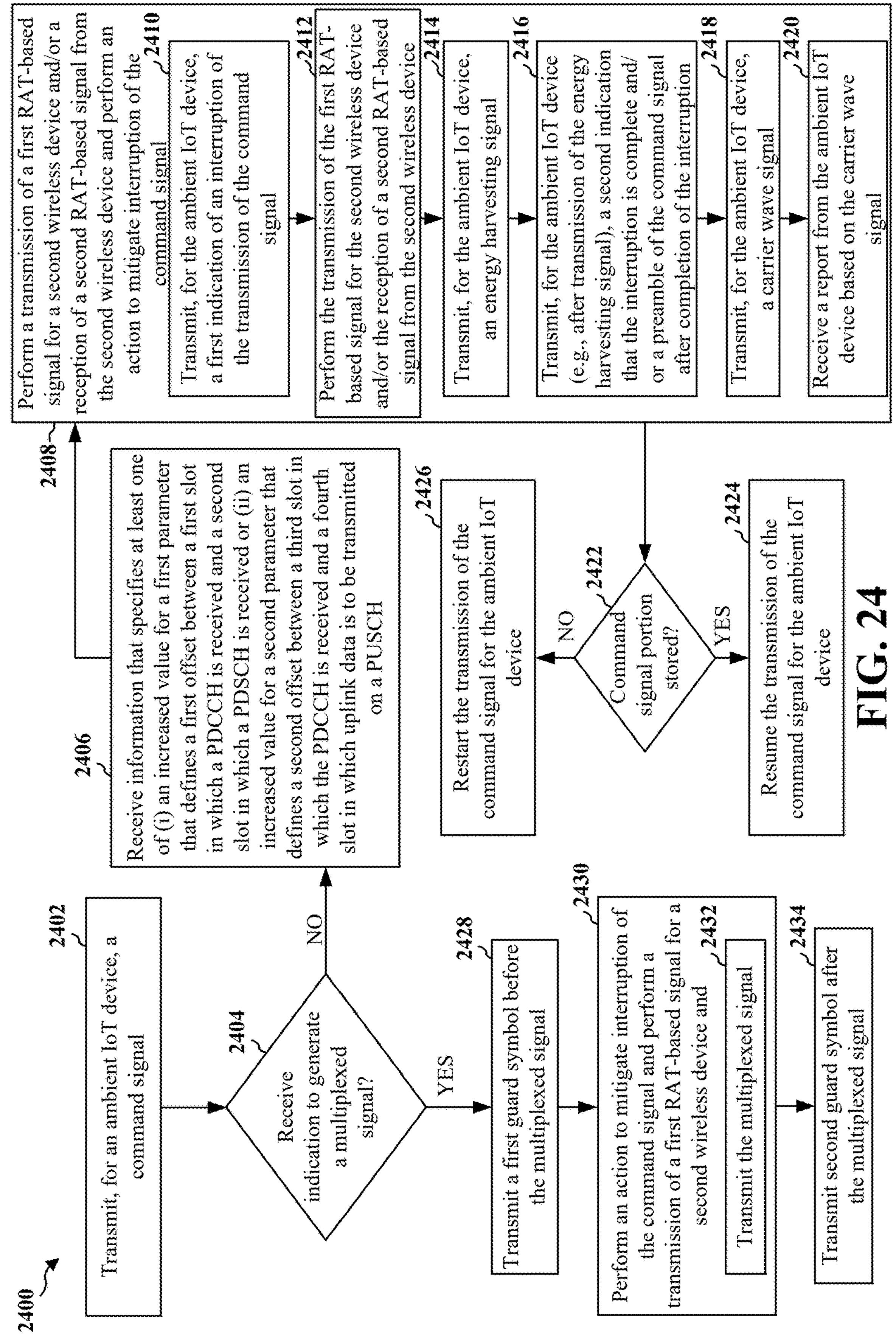
FIG. 24 is a flowchart illustrating methods of wireless communication in accordance with various aspects of the present disclosure.

FIG. 24 is a flowchart 2400 illustrating methods of wireless communication at a first wireless device in accordance with various aspects of the present disclosure. In some aspects, the first wireless device may be the UE 104, the UE 350, the UE 504, the UE 704A, the UE 704B, the UE 704C, the UE 804A, the UE 804B, the UE 904, the UE 1004, the UE 1104, the UE 1204, the UE 1304, the UE 1404, the UE 1504, the UE 1704, the UE 1804, the UE 1904, or the UE 2004, or the apparatus 2504 in the hardware implementation of FIG. 25. In other aspects, the first wireless device may be the base station 102, the base station 310, the network node 502, the network node 702A, the network node 702B, the network node 702C, the network node 802A, the network node 802B, the network node 902, the network node 1002, the network node 1102, the network node 1702, the network node 1802, the network node 1902, or the network node 2002, or the network entity 2602 in the hardware implementation of FIG. 26.

At 2402, the first wireless device may transmit, for an ambient IoT device, a command signal. For example, referring to FIG. 19, the UE 1904 may, at 1908, transmit a command signal to the ambient IoT device 1906. In another example, referring to FIG. 20, the UE 2004 may, at 2008, transmit a command signal to the ambient IoT device 2006. In an aspect, 2402 may be performed by the A-IoT forward link interruption mitigation component 198 or the A-IoT forward link interruption mitigation component 199.

At 2404, the first wireless device may determine whether an indication to generate a multiplexed signal including the first RAT-based signal for the second wireless device and the command signal for the ambient IoT device is received from the second wireless device. In response to a determination that the indication is not received, flow continues to 2406. Otherwise, flow continues to 2428. For example, referring to FIG. 20, the UE 2004 may, at 2012, receive, from the network node 2002, an indication to generate a multiplexed signal including the first RAT-based signal for the network node 2002 and the command signal for the ambient IoT device 2006. In response to receiving the indication, flow continues to 2426. Otherwise, flow continues to 2406. In an aspect, 2404 may be performed by the A-IoT forward link interruption mitigation component 198 or the A-IoT forward link interruption mitigation component 199.

At 2406, the first wireless device may receive information that specifies at least one of (i) an increased value for a first parameter that defines a first offset between a first slot in which a PDCCH is received and a second slot in which a PDSCH is received or (ii) an increased value for a second parameter that defines a second offset between a third slot in which the PDCCH is received and a fourth slot in which uplink data is to be transmitted on a PUSCH. For example, referring to FIG. 19, the UE 1904 may, at 1912, receive information that specifies at least one of (i) an increased value for a first parameter that defines a first offset between a first slot in which a PDCCH is received and a second slot in which a PDSCH is received or (ii) an increased value for a second parameter that defines a second offset between a third slot in which the PDCCH is received and a fourth slot in which uplink data is to be transmitted on a PUSCH. The UE 1904 may transmit the first indication at 1914 based on the first parameter and the second parameter. In an aspect, 2406 may be performed by the A-IoT forward link interruption mitigation component 198 or the A-IoT forward link interruption mitigation component 199.

At 2408, the first wireless device may perform at least one of a transmission of a first RAT-based signal for a second wireless device or a reception of a second RAT-based signal from the second wireless device and perform an action to mitigate interruption of the command signal. For example, referring to FIG. 19, the UE 1904 may perform at least one of a transmission of a first RAT-based signal for the network node 1902 at 1920 or a reception of a second RAT-based signal from the network node 1902 at 1918. At 1910, the UE 1904 may perform an action to mitigate interruption of the command signal. In an aspect, 2408 may be performed by the A-IoT forward link interruption mitigation component 198 or the A-IoT forward link interruption mitigation component 199.

In some aspects, each of the first RAT-based signal and the second RAT-based signal interrupts transmission of the command signal. For example, referring to FIG. 19, the first RAT-based signal that may be transmitted by the UE 1904 at 1920 and the second RAT-based signal that may be received by the UE 1904 at 1918 may interrupt transmission of the command signal transmitted at 1908.

In some aspects, as part of 2408, at 2410, the first wireless device may transmit, for the ambient IoT device, a first indication of an interruption of the transmission of the command signal. For example, referring to FIG. 19, the UE 1904 may, at 1914, transmit, for the ambient IoT device 1906, a first indication of an interruption of the transmission of the command signal (e.g., the interruption-start flag). In an aspect, 2410 may be performed by the A-IoT forward link interruption mitigation component 198 or the A-IoT forward link interruption mitigation component 199.

In some aspects, the first indication may indicate a duration for which the transmission of the command signal has been interrupted. For example, referring to FIG. 19, the first indication transmitted by the UE 1904 at 1914 may indicate a duration for which the transmission of the command signal has been interrupted.

As part of 2410, at 2412, the first wireless device may perform at least one of a transmission of a first RAT-based signal for a second wireless device or a reception of a second RAT-based signal from the second wireless device (e.g., after transmitting the first indication at 1914). For example, referring to FIG. 19, the UE 1904 may perform at least one of a transmission of a first RAT-based signal for the network node 1902 at 1920 or a reception of a second RAT-based signal from the network node 1902 at 1918. In an aspect, 2412 may be performed by the A-IoT forward link interruption mitigation component 198 or the A-IoT forward link interruption mitigation component 199.

In some aspects, as part of 2410, at 2414, the first wireless device may transmit, for the ambient IoT device, an energy harvesting signal, transmitting, for the ambient IoT device after the transmission of the energy harvesting signal, a second indication that the interruption is complete. For example, referring to FIG. 19, the UE 1904 may, at 1922, transmit, for the ambient IoT device 1906, an energy harvesting signal. In an aspect, 2414 may be performed by the A-IoT forward link interruption mitigation component 198 or the A-IoT forward link interruption mitigation component 199. In some aspects, as part of 2410, at 2416, the first wireless device may transmit, for the ambient IoT device, a second indication that the interruption is complete and/or a preamble of the command signal after completion of the interruption (e.g., after transmission of the energy harvesting signal at 2414). For example, referring to FIG. 19, the UE 1904 may, at 1926, transmit, for the ambient IoT device 1906, a second indication that the interruption is complete (e.g., the interruption-end flag) and/or the preamble of the command signal after completion of the interruption (e.g., after transmission of the energy harvesting signal at 2414). In an aspect, 2416 may be performed by the A-IoT forward link interruption mitigation component 198 or the A-IoT forward link interruption mitigation component 199.

In some aspects, as part of 2410, at 2418, the first wireless device may transmit, for the ambient IoT device, a carrier wave signal. For example, referring to FIG. 19, the UE 1904 may, at 1928, transmit, for the ambient IoT device 1906, a carrier wave signal. In an aspect, 2418 may be performed by the A-IoT forward link interruption mitigation component 198 or the A-IoT forward link interruption mitigation component 199.

In some aspects, as part of 2410, at 2420, the first wireless device may receive a report from the ambient IoT device based on the carrier wave signal, where the report indicates whether a portion of the command signal is stored at the ambient IoT device. For example, referring to FIG. 19, the UE 1904 may, at 1930, receive a report from the ambient IoT device 1906 based on the carrier wave signal, where the report indicates whether a portion of the command signal is stored at the ambient IoT device 1906. In an aspect, 2420 may be performed by the A-IoT forward link interruption mitigation component 198 or the A-IoT forward link interruption mitigation component 199.

In some aspects, at 2422, the first wireless device may determine whether the ambient IoT device stored a portion of the command signal based on the report. In response to a determination that ambient IoT device stored a portion of the command signal, flow continues to 2424. Otherwise, flow continues to 2426. For example, referring to FIG. 19, the UE 1904 may analyze the report received at 1930 and determine whether the ambient IoT device 1906 stored a portion of the command signal (received at 1908) based on the report. In response to a determination that ambient IoT device 1906 stored a portion of the command signal, flow continues to 2424. Otherwise, flow continues to 2426. In an aspect, 2422 may be performed by the A-IoT forward link interruption mitigation component 198 or the A-IoT forward link interruption mitigation component 199.

At 2424, the first wireless device may resume the transmission of the command signal for the ambient IoT device (e.g., by transmitting a remaining portion of the command signal). For example, referring to FIG. 19, the UE 1904, at 1932, may resume the transmission of the command signal for the ambient IoT device 1906 (e.g., by transmitting a remaining portion of the command signal). In an aspect, 2424 may be performed by the A-IT forward link interruption mitigation component 198 or the A-IoT forward link interruption mitigation component 199.

At 2426, the first wireless device may restart the transmission of the command signal for the ambient IoT device. For example, referring to FIG. 19, the UE 1904, at 1932, may restart the transmission of the command signal for the ambient IoT device 1906. In an aspect, 2426 may be performed by the A-IoT forward link interruption mitigation component 198 or the A-IoT forward link interruption mitigation component 199.

At 2428, the first wireless device may transmit a first guard symbol before the multiplexed signal. For example, referring to FIG. 20, the UE 2004, at 2016, may transmit a first guard symbol before the multiplexed signal. In an aspect, 2428 may be performed by the A-IoT forward link interruption mitigation component 198 or the A-IT forward link interruption mitigation component 199.

At 2430, the first wireless device may perform an action to mitigate interruption of the command signal and perform a transmission of a first RAT-based signal for a second wireless device. For example, referring to FIG. 20, the UE 2004, at 2014, may perform an action to mitigate interruption of the command signal (e.g., by generating a multiplexed signal). In an aspect, 2430 may be performed by the A-IoT forward link interruption mitigation component 198 or the A-IoT forward link interruption mitigation component 199.

In some aspects, as part of 2430, at 2432, to transmit the first RAT-based signal, the first wireless device may transmit the multiplexed signal. For example, referring to FIG. 20, the UE 2004, at 2018, may transmit the multiplexed signal. In an aspect, 2432 may be performed by the A-IoT forward link interruption mitigation component 198 or the A-IoT forward link interruption mitigation component 199.

At 2434, the first wireless device may transmit a second guard symbol after the multiplexed signal. For example, referring to FIG. 20, the UE 2004, at 2020, may transmit a second guard symbol. In an aspect, 2434 may be performed by the A-IoT forward link interruption mitigation component 198 or the A-IoT forward link interruption mitigation component 199.

Figure 25:
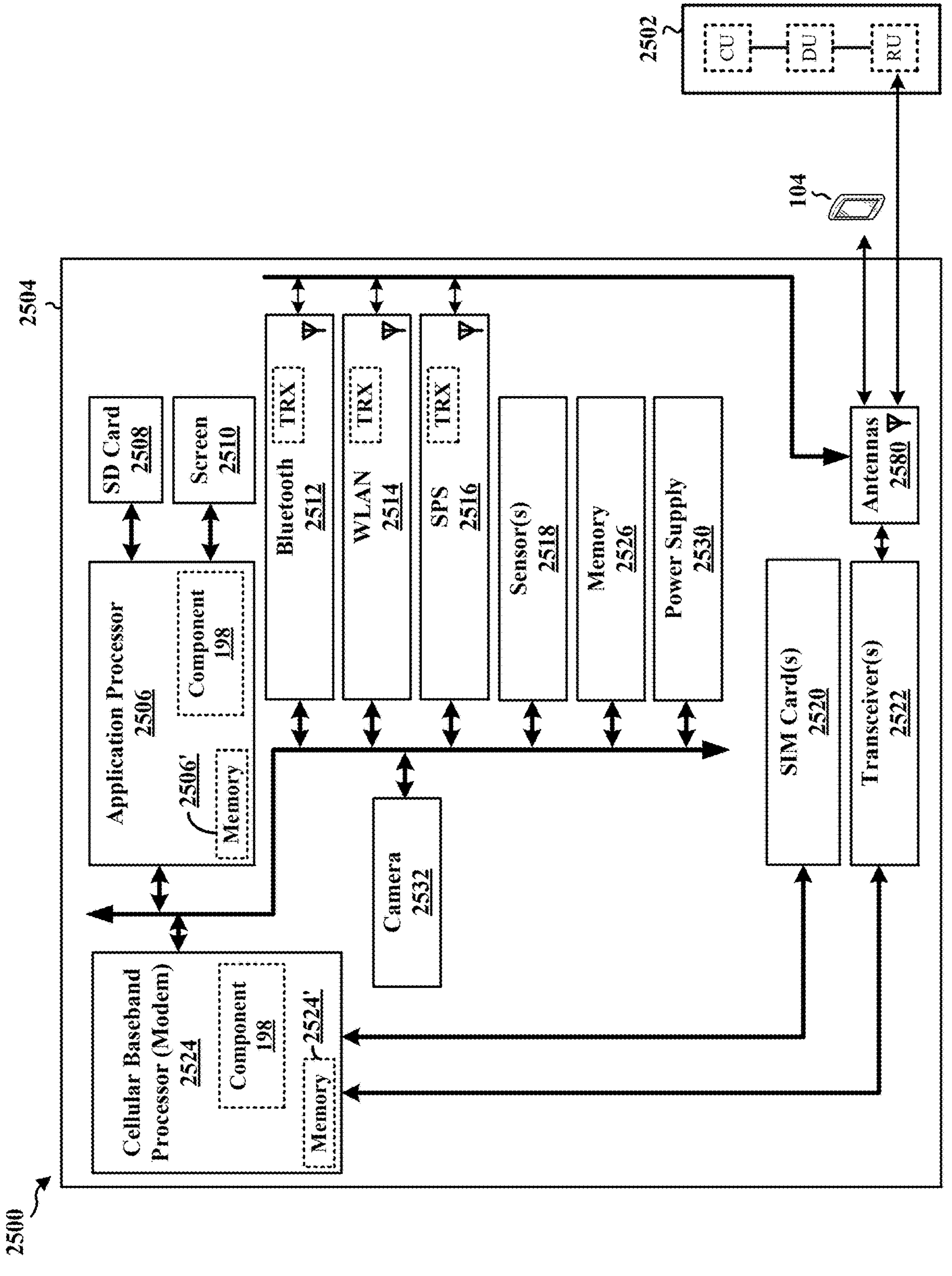
FIG. 25 is a diagram illustrating an example of a hardware implementation for an example apparatus and/or network entity.

FIG. 25 is a diagram 2500 illustrating an example of a hardware implementation for an apparatus 2504. The apparatus 2504 may be a UE, a component of a UE, or may implement UE functionality. In some aspects, the apparatus 2504 may include a cellular baseband processor 2524 (also referred to as a modem) coupled to one or more transceivers 2522 (e.g., cellular RF transceiver). The cellular baseband processor 2524 may include on-chip memory 2524'. In some aspects, the apparatus 2504 may further include one or more subscriber identity modules (SIM) cards 2520 and an application processor 2506 coupled to a secure digital (SD) card 2508 and a screen 2510. The application processor 2506 may include on-chip memory 2506'. In some aspects, the apparatus 2504 may further include a Bluetooth module 2512, a WLAN module 2514, an SPS module 2516 (e.g., GNSS module), one or more sensor modules 2518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2526, a power supply 2530, and/or a camera 2532. The Bluetooth module 2512, the WLAN module 2514, and the SPS module 2516 may include an on-chip transceiver (TRX) (or in some cases, just a receiver (RX)). The Bluetooth module 2512, the WLAN module 2514, and the SPS module 2516 may include their own dedicated antennas and/or utilize the antennas 2580 for communication. The cellular baseband processor 2524 communicates through the transceiver(s) 2522 via one or more antennas 2580 with the UE 104 and/or with an RU associated with a network entity 2502. The cellular baseband processor 2524 and the application processor 2506 may each include a computer-readable medium/memory 2524', 2506', respectively. The additional memory modules 2526 may also be considered a computer-readable medium/memory. Each computer-readable medium/memory 2524', 2506', 2526 may be non-transitory. The cellular baseband processor 2524 and the application processor 2506 are each responsible for general processing, including the execution of software stored on the computer-readable medium/memory. The software, when executed by the cellular baseband processor 2524/application processor 2506, causes the cellular baseband processor 2524/application processor 2506 to perform the various functions described supra. The computer-readable medium/memory may also be used for storing data that is manipulated by the cellular baseband processor 2524/application processor 2506 when executing software. The cellular baseband processor 2524/application processor 2506 may be a component of the UE 350 and may include the memory 360 and/or at least one of the TX processor 368, the RX processor 356, and the controller/processor 359. In one configuration, the apparatus 2504 may be a processor chip (modem and/or application) and include just the cellular baseband processor 2524 and/or the application processor 2506, and in another configuration, the apparatus 2504 may be the entire UE (e.g., see UE 350 of FIG. 3) and include the additional modules of the apparatus 2504.

As discussed supra, the component 198 may be configured to transmit, for a first duration, a first portion of an energy harvesting signal to an ambient IoT device, the first duration being less than a total duration for energy harvesting to complete at the ambient IoT device, to receive one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal, and to perform an action to mitigate interruption of the energy harvesting signal. The component 198 may also be configured to transmit, for an ambient IoT device, a command signal, to perform at least one of a transmission of a first RAT-based signal for a second wireless device or a reception of a second RAT-based signal from the second wireless device, and to perform an action to mitigate interruption of the command signal. The component 198 may be configured to perform any of the aspects described in connection with the flowcharts in FIGS. 21-24 and/or the aspects performed by the UE 1704, the UE 1804, the UE 1904, or the UE 2004 in the communication flows in FIGS. 17-20. The component 198 may be within the cellular baseband processor 2524, the application processor 2506, or both the cellular baseband processor 2524 and the application processor 2506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2504 may include a variety of components configured for various functions. In one configuration, the apparatus 2504, and in particular the cellular baseband processor 2524 and/or the application processor 2506, may include means for transmitting, for a first duration, a first portion of an energy harvesting signal to an ambient IoT device, the first duration being less than a total duration for energy harvesting to complete at the ambient IoT device, means for receiving one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal, and means for performing an action to mitigate interruption of the energy harvesting signal. In another configuration, the apparatus 2504, and in particular the cellular baseband processor 2524 and/or the application processor 2506, may include means for transmitting, for an ambient IoT device, a command signal, means for performing at least one of a transmission of a first RAT-based signal for a second wireless device or a reception of a second RAT-based signal from the second wireless device, and means for performing an action to mitigate interruption of the command signal. The means may be the component 198 of the apparatus 2504 configured to perform the functions recited by the means. As described supra, the apparatus 2504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 26:
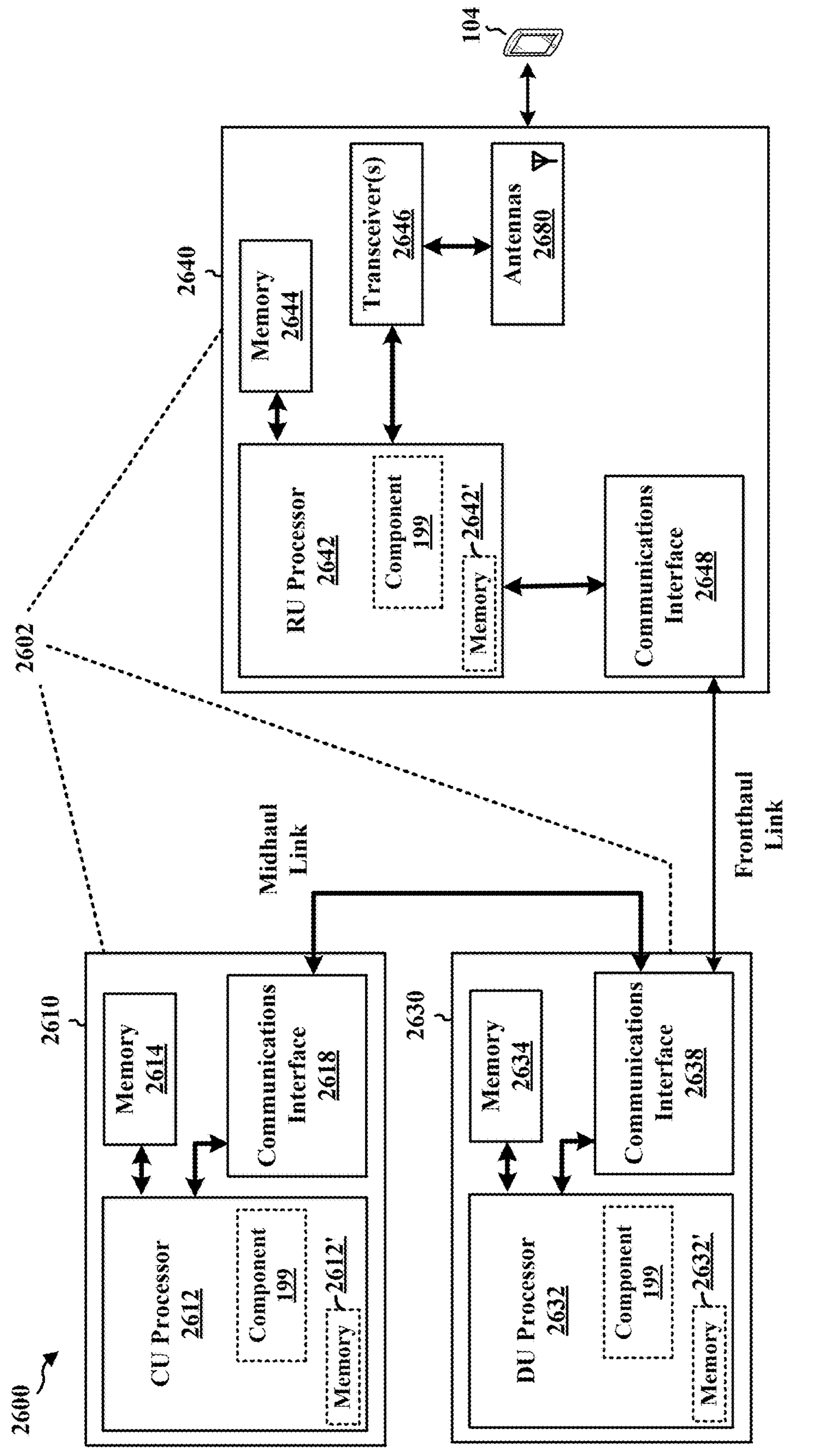
FIG. 26 is a diagram illustrating an example of a hardware implementation for an example network entity.

FIG. 26 is a diagram 2600 illustrating an example of a hardware implementation for a network entity 2602. The network entity 2602 may be a BS, a component of a BS, or may implement BS functionality. The network entity 2602 may include at least one of a CU 2610, a DU 2630, or an RU 2640. For example, depending on the layer functionality handled by the component 199, the network entity 2602 may include the CU 2610; both the CU 2610 and the DU 2630; each of the CU 2610, the DU 2630, and the RU 2640; the DU 2630; both the DU 2630 and the RU 2640; or the RU 2640. The CU 2610 may include a CU processor 2612. The CU processor 2612 may include on-chip memory 2612'. In some aspects, the CU 2610 may further include additional memory modules 2614 and a communications interface 2618. The CU 2610 communicates with the DU 2630 through a midhaul link, such as an F1 interface. The DU 2630 may include a DU processor 2632. The DU processor 2632 may include on-chip memory 2632'. In some aspects, the DU 2630 may further include additional memory modules 2634 and a communications interface 2638. The DU 2630 communicates with the RU 2640 through a fronthaul link. The RU 2640 may include an RU processor 2642. The RU processor 2642 may include on-chip memory 2642'. In some aspects, the RU 2640 may further include additional memory modules 2644, one or more transceivers 2646, antennas 2680, and a communications interface 2648. The RU 2640 communicates with the UE 104. The on-chip memory 2612', 2632', 2642' and the additional memory modules 2614, 2634, 2644 may each be considered a computer-readable medium/memory. Each computer-readable medium/memory may be non-transitory. Each of the processors 2612, 2632, 2642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, for a first duration, a first portion of an energy harvesting signal to an ambient IoT device, the first duration being less than a total duration for energy harvesting to complete at the ambient IoT device, to receive one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal, and to perform an action to mitigate interruption of the energy harvesting signal. The component 199 may also be configured to transmit, for an ambient IoT device, a command signal, to perform at least one of a transmission of a first RAT-based signal for a second wireless device or a reception of a second RAT-based signal from the second wireless device, and to perform an action to mitigate interruption of the command signal. The component 199 may be configured to perform any of the aspects described in connection with the flowcharts in FIGS. 21-24 and/or the aspects performed by the network node 1702, the network node 1802, the network node 1902, or the network node 2002 in the communication flows in FIGS. 17-20. The component 199 may be within one or more processors of one or more of the CU 2610, DU 2630, and the RU 2640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2602 may include a variety of components configured for various functions. In one configuration, the network entity 2602 may include means for transmitting, for a first duration, a first portion of an energy harvesting signal to an ambient IoT device, the first duration being less than a total duration for energy harvesting to complete at the ambient IoT device, means for receiving one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal, and means for performing an action to mitigate interruption of the energy harvesting signal. In another configuration, the network entity 2602 may include means for transmitting, for an ambient IoT device, a command signal, means for performing at least one of a transmission of a first RAT-based signal for a second wireless device or a reception of a second RAT-based signal from the second wireless device, and means for performing an action to mitigate interruption of the command signal. The means may be the component 199 of the network entity 2602 configured to perform the functions recited by the means. As described supra, the network entity 2602 may include the TX processor 316, the RX processor 370, and the controller/processor 375. As such, in one configuration, the means may be the TX processor 316, the RX processor 370, and/or the controller/processor 375 configured to perform the functions recited by the means.

Various aspects relate generally to communication systems. Some aspects more specifically relate to mitigating ambient IoT (A-IoT) forward link interruptions. In some examples, a first wireless device (e.g., a UE or a network node) may transmit an energy harvesting signal or a command signal to an A-IoT device. Such commands may be interrupted by an NR-based signal (e.g., a downlink signal, an uplink signal, or a sidelink signal) either received by the first wireless device from a second wireless device (e.g., a UE or a network node) or transmitted by the first wireless device to the second wireless device. In some examples, to mitigate an interruption to an energy harvesting signal by an uplink signal, the uplink signal may also be utilized for energy harvesting by the A-IoT device. The first wireless device may utilize additional frequency and/or time resources and/or increase the transmit power when transmitting the uplink signal. To mitigate an interruption to an energy harvesting signal by a downlink signal, the first wireless device may restart or resume the energy harvesting signal after reception of the downlink signal is completed. To mitigate an interruption to a command signal by either an uplink signal or a downlink signal, the first wireless device may indicate the interruption (e.g., via an interruption flag) to the A-IoT device before the interruption occurs and may provide the remaining command signal after the interruption. The interruption indication may assist the A-IoT tag to receive the resumed command after the interruption. Alternatively, for uplink signal-based interruptions to a command signal, the first wireless device may transmit a multiplexed signal to both the second wireless device and the A-IoT device that includes both the uplink signal and the command signal. In such a scenario, the first wireless device may transmit a guard symbol before and/or after the multiplexed signal.

Particular aspects of the subject matter described in this disclosure can be implemented to realize one or more of the following potential advantages. In particular, the mitigation techniques described herein address collisions (e.g., interruptions) between NR-based signals and A-IoT signals by, for example, optimizing the energy harvesting efficiency of an A-IoT device and reducing command transmission failures and retransmissions for the A-IoT device. In some examples, by utilizing additional frequency and/or time resources and/or increasing the transmit power when transmitting an uplink signal for energy harvesting at an A-IoT device, the energy harvesting efficiency at the A-IoT device may be increased. In another example, by transmitting a guard symbol before and/or after the multiplexed signal, demodulation errors at the A-IoT may be prevented.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, including: transmitting, for a first duration, a first portion of an energy harvesting signal to an ambient IoT device, the first duration being less than a total duration for energy harvesting to complete at the ambient IoT device; receiving one of (a) an indication that a first RAT-based signal is to be transmitted by the first wireless device or (b) a second RAT-based signal from a second wireless device, where each of the first RAT-based signal and the second RAT-based signal interrupts transmission of the energy harvesting signal; and performing an action to mitigate interruption of the energy harvesting signal.

Aspect 2 is the method of aspect 1, where performing the action to mitigate the interruption of the energy harvesting signal includes: in response to receiving the indication that the first RAT-based signal is to be transmitted by the first wireless device: pausing transmission of the energy harvesting signal; and transmitting, for the second wireless device and the ambient IoT device, the first RAT-based signal, where the first RAT-based signal is configured to enable energy harvesting at the ambient IoT device.

Aspect 3 is the method of aspect 2, where transmitting the first RAT-based signal includes: receiving an indication of resources allocated by the second wireless device for transmission of the first RAT-based signal; and transmitting the first RAT-based signal based on the resources allocated by the second wireless device.

Aspect 4 is the method of aspect 3, further including: transmitting, for the second wireless device, a request for the resources.

Aspect 5 is the method of any of aspects 2 to 4, where transmitting the first RAT-based signal includes: increasing a power level for transmitting the first RAT-based signal; and transmitting the first RAT-based signal based on the increased power level.

Aspect 6 is the method of aspect 5, further including: transmitting, for the second wireless device, an indication of the increased power level.

Aspect 7 is the method of aspect 1, where performing the action to mitigate the interruption of the energy harvesting signal includes: performing, for a second duration in response to receiving the second RAT-based signal from the second wireless device, one of a resumption of the transmission of the energy harvesting signal or a restart of the transmission of the energy harvesting signal, where the resumption and the restart include a second portion of the energy harvesting signal.

Aspect 8 is the method of aspect 7, where the second duration is equal to the total duration.

Aspect 9 is the method of aspect 7, where the second duration corresponds to a difference between the total duration and the first duration, and where the second portion is different than the first portion.

Aspect 10 is the method of aspect 7, where the second duration is less than a difference between the total duration and the first duration, and where the second portion is different than the first portion.

Aspect 11 is a method of wireless communication at a first wireless device, including: transmitting, for an ambient IoT device, a command signal performing at least one of a transmission of a first RAT-based signal for a second wireless device or a reception of a second RAT-based signal from the second wireless device; and performing an action to mitigate interruption of the command signal.

Aspect 12 is the method of aspect 11, where each of the first RAT-based signal and the second RAT-based signal interrupts transmission of the command signal, and where performing the action to mitigate the interruption of the command signal includes: transmitting, for the ambient IoT device, a first indication of an interruption of the transmission of the command signal.

Aspect 13 is the method of aspect 12, further including: receiving information that specifies at least one of (i) an increased value for a first parameter that defines a first offset between a first slot in which a PDCCH is received and a second slot in which a PDSCH is received or (ii) an increased value for a second parameter that defines a second offset between a third slot in which the PDCCH is received and a fourth slot in which uplink data is to be transmitted on a PUSCH.

Aspect 14 is the method of any of aspects 12 and 13, where the first indication indicates a duration for which the transmission of the command signal has been interrupted.

Aspect 15 is the method of any of aspects 12 to 14, where performing the action to mitigate the interruption of the command signal further includes: transmitting, for the ambient IoT device, a second indication that the interruption is complete; and resuming the transmission of the command signal for the ambient IoT device.

Aspect 16 is the method of any of aspects 12 to 14, where performing the action to mitigate the interruption of the command signal further includes: transmitting, for the ambient IoT device, a preamble of the command signal after completion of the interruption; and resuming the transmission of the command signal for the ambient IoT device.

Aspect 17 is the method of any of aspects 12 to 16, where performing the action to mitigate the interruption of the command signal further includes: transmitting, for the ambient IoT device, an energy harvesting signal; transmitting, for the ambient IoT device after the transmission of the energy harvesting signal, a second indication that the interruption is complete; and resuming the transmission of the command signal for the ambient IoT device.

Aspect 18 is the method of any of aspects 12 to 17, where performing the action to mitigate the interruption of the command signal further includes: transmitting, for the ambient IoT device, a carrier wave signal; receiving a report from the ambient IoT device based on the carrier wave signal, where the report indicates whether a portion of the command signal is stored at the ambient IoT device; transmitting, for the ambient IoT device in response to determining that the portion of the command signal is stored at the ambient IoT device, a remaining portion of the command signal; and restarting the transmission, in response to determining that the portion of the command signal is not stored at the ambient IoT device, of the command signal for the ambient IoT device.

Aspect 19 is the method of aspect 11, further including: receiving, from the second wireless device, an indication to generate a multiplexed signal including the first RAT-based signal for the second wireless device and the command signal for the ambient IoT device; where performing the transmission of the first RAT-based signal and the action to mitigate the interruption of the command signal includes transmitting the multiplexed signal.

Aspect 20 is the method of aspect 19, further including: transmitting at least one of a first guard symbol before the multiplexed signal or a second guard symbol after the multiplexed signal.

Aspect 21 is an apparatus for wireless communication at a first wireless device. The apparatus includes memory; and at least one processor coupled to the memory and, based at least in part on information stored in the memory, the at least one processor is configured to implement any of aspects 1 to 10.

Aspect 22 is the apparatus of aspect 21, further including at least one of a transceiver or an antenna coupled to the at least one processor.

Aspect 23 is an apparatus for wireless communication at a first wireless device. The apparatus includes memory; and at least one processor coupled to the memory and, based at least in part on information stored in the memory, the at least one processor is configured to implement any of aspects 11 to 20.

Aspect 24 is the apparatus of aspect 23, further including at least one of a transceiver or an antenna coupled to the at least one processor.

Aspect 25 is an apparatus for wireless communication including means for implementing any of aspects 1 to 10.

Aspect 26 is an apparatus for wireless communication including means for implementing any of aspects 11 to 20.

Aspect 27 is a computer-readable medium (e.g., a non-transitory computer-readable medium) storing computer executable code, where the code when executed by a processor causes the processor to implement any of aspects 1 to 10.

Aspect 28 is a computer-readable medium (e.g., a non-transitory computer-readable medium) storing computer executable code, where the code when executed by a processor causes the processor to implement any of aspects 11 to 20.

What is claimed is:

1. An apparatus for wireless communication at a first wireless device, comprising:

a memory; and at least one processor coupled to the memory and, based at least in part on information stored in the memory, the at least one processor is configured to:

transmit, for a first duration, a first portion of an energy harvesting signal to an ambient Internet-of-Things (IoT) device, the first duration being less than a total duration for energy harvesting to complete at the ambient IoT device;

receive one of (a) an indication that a first radio access technology (RAT)-based signal is configured to be transmitted by the first wireless device or (b) a second RAT-based signal from a second wireless device, wherein each of the first RAT-based signal and the second RAT-based signal interrupts transmission of the energy harvesting signal; and perform an action to mitigate interruption of the energy harvesting signal.

2. The apparatus of claim 1, wherein, to perform the action to mitigate the interruption of the energy harvesting signal, the at least one processor is configured to:

in response to the reception of the indication that the first RAT-based signal is configured to be transmitted by the first wireless device:

pause transmission of the energy harvesting signal; and transmit, for the second wireless device and the ambient IoT device, the first RAT-based signal, wherein the first RAT-based signal is configured to enable energy harvesting at the ambient IoT device.

3. The apparatus of claim 2, wherein, to transmit the first RAT-based signal, the at least one processor is configured to:

receive an indication of resources allocated by the second wireless device for transmission of the first RAT-based signal; and transmit the first RAT-based signal based on the resources allocated by the second wireless device.

4. The apparatus of claim 3, wherein the at least one processor is further configured to:

transmit, for the second wireless device, a request for the resources.

5. The apparatus of claim 2, wherein, to transmit the first RAT-based signal, the at least one processor is configured to:

increase a power level for a transmission of the first RAT-based signal; and transmit the first RAT-based signal based on the increased power level.

6. The apparatus of claim 1, wherein, to perform the action to mitigate the interruption of the energy harvesting signal, the at least one processor is configured to:

perform, for a second duration in response to reception of the second RAT-based signal from the second wireless device, one of a resumption of the transmission of the energy harvesting signal or a restart of the transmission of the energy harvesting signal, wherein the resumption and the restart include a second portion of the energy harvesting signal.

7. An apparatus for wireless communication at a first wireless device, comprising:

a memory; and at least one processor coupled to the memory and, based at least in part on information stored in the memory, the at least one processor is configured to:

transmit, for an ambient Internet-of-Things (IoT) device, a command signal;

perform at least one of a transmission of a first radio access technology (RAT)-based signal fora second wireless device or a reception of a second RAT-based signal from the second wireless device; and perform an action to mitigate interruption of the command signal.

8. The apparatus of claim 7, wherein each of the first RAT-based signal and the second RAT-based signal interrupts transmission of the command signal, and wherein, to perform the action to mitigate the interruption of the command signal, the at least one processor is configured to:

transmit, for the ambient IoT device, a first indication of an interruption of the transmission of the command signal.

9. The apparatus of claim 8, wherein the at least one processor is further configured to:

receive information that specifies at least one of (i) an increased value for a first parameter that defines a first offset between a first slot for a reception of a physical downlink control channel (PDCCH) and a second slot for a reception of a physical downlink shared channel (PDSCH) or (ii) an increased value for a second parameter that defines a second offset between a third slot for the reception of the PDCCH and a fourth slot in which uplink data is configured to be transmitted on a physical uplink shared channel (PUSCH).

10. The apparatus of claim 8, wherein the first indication indicates a duration for which the transmission of the command signal has been interrupted.

11. The apparatus of claim 8, wherein, to perform the action to mitigate the interruption of the command signal, the at least one processor is configured to:

transmit, for the ambient IoT device, a second indication that the interruption is complete; and resume the transmission of the command signal for the ambient IoT device.

12. The apparatus of claim 8, wherein, to perform the action to mitigate the interruption of the command signal further, the at least one processor is configured to:

transmit, for the ambient IoT device, a preamble of the command signal after completion of the interruption; and resume the transmission of the command signal for the ambient IoT device.

13. The apparatus of claim 7, wherein, to perform the action to mitigate the interruption of the command signal further, the at least one processor is configured to:

transmit, for the ambient IoT device, a carrier wave signal;

receive a report from the ambient IoT device based on the carrier wave signal, wherein the report indicates whether a portion of the command signal is stored at the ambient IoT device;

transmit, for the ambient IoT device in response to a determination that the portion of the command signal is stored at the ambient IoT device, a remaining portion of the command signal; and restart the transmission, in response to a determination that the portion of the command signal is not stored at the ambient IoT device, of the command signal for the ambient IoT device.

14. The apparatus of claim 7, wherein the at least one processor is further configured to:

receive, from the second wireless device, an indication to generate a multiplexed signal comprising the first RAT-based signal for the second wireless device and the command signal for the ambient IoT device;

wherein, to perform the transmission of the first RAT-based signal and the action to mitigate the interruption of the command signal, the at least one processor is configured to transmit the multiplexed signal.

15. The apparatus of claim 14, wherein the at least one processor is further configured to:

transmit at least one of a first guard symbol before the multiplexed signal or a second guard symbol after the multiplexed signal.

16. A method for wireless communication at a first wireless device, comprising:

transmitting, for a first duration, a first portion of an energy harvesting signal to an ambient Internet-of-Things (IoT) device, the first duration being less than a total duration for energy harvesting to complete at the ambient IoT device;

receiving one of (a) an indication that a first radio access technology (RAT)-based signal is to be transmitted by the first wireless device or (b) a second RAT-based signal from a second wireless device, wherein each of the first RAT-based signal and the second RAT-based signal interrupts transmission of the energy harvesting signal; and performing an action to mitigate interruption of the energy harvesting signal.

17. The method of claim 16, wherein performing the action to mitigate the interruption of the energy harvesting signal comprises:

in response to receiving the indication that the first RAT-based signal is to be transmitted by the first wireless device:

pausing transmission of the energy harvesting signal; and transmitting, for the second wireless device and the ambient IoT device, the first RAT-based signal, wherein the first RAT-based signal is configured to enable energy harvesting at the ambient IoT device.

18. The method of claim 17, wherein transmitting the first RAT-based signal comprises:

receiving an indication of resources allocated by the second wireless device for transmission of the first RAT-based signal; and transmitting the first RAT-based signal based on the resources allocated by the second wireless device.

19. The method of claim 18, further comprising:

transmitting, for the second wireless device, a request for the resources.

20. The method of claim 17, wherein transmitting the first RAT-based signal comprises:

increasing a power level for transmitting the first RAT-based signal; and transmitting the first RAT-based signal based on the increased power level.

* * * * *